(12) United States Patent
Hickey

(10) Patent No.: US 11,132,105 B2
(45) Date of Patent: Sep. 28, 2021

(54) CAPTURING ELECTRONIC SIGNATURES USING AN EXPANDED INTERFACE AREA

(71) Applicant: Adobe Inc., San Jose, CA (US)

(72) Inventor: Shannon Hickey, Newmarket (CA)

(73) Assignee: ADOBE INC., San Jose, CA (US)

( * ) Notice: Subject to any disclaimer, the term of this patent is extended or adjusted under 35 U.S.C. 154(b) by 1025 days.

(21) Appl. No.: 14/698,220

(22) Filed: Apr. 28, 2015

(65) Prior Publication Data

US 2016/0321214 A1 Nov. 3, 2016

(51) Int. Cl.
*G06F 3/0484* (2013.01)
*G06F 3/0488* (2013.01)
*G06F 40/169* (2020.01)
*G06F 40/171* (2020.01)

(52) U.S. Cl.
CPC ........ *G06F 3/0484* (2013.01); *G06F 3/04845* (2013.01); *G06F 3/04883* (2013.01); *G06F 40/169* (2020.01); *G06F 40/171* (2020.01)

(58) Field of Classification Search
CPC ............. G06F 3/04883; G06F 3/04886; G06F 3/0484; G06F 3/04845; G06F 40/169; G06F 40/171
See application file for complete search history.

(56) References Cited

U.S. PATENT DOCUMENTS

| | | | |
|---|---|---|---|
| 5,455,901 A | 10/1995 | Friend et al. | |
| 5,598,487 A * | 1/1997 | Hacker | G06F 1/1626 178/18.01 |
| 6,408,092 B1 * | 6/2002 | Sites | G06F 3/04883 345/158 |
| 10,083,163 B2 | 9/2018 | Hickey et al. | |
| 2005/0120296 A1 | 6/2005 | Zeuli | |
| 2008/0235577 A1 * | 9/2008 | Veluchamy | G06F 17/243 715/268 |
| 2010/0128291 A1 * | 5/2010 | Vendrow | G06F 21/64 358/1.9 |
| 2010/0195910 A1 * | 8/2010 | Tsay | G06F 17/241 382/189 |
| 2011/0060985 A1 * | 3/2011 | Kerr | G06F 3/04812 715/702 |
| 2012/0092374 A1 * | 4/2012 | Sarnoff | G06F 3/04883 345/634 |

(Continued)

FOREIGN PATENT DOCUMENTS

JP 2014139764 A * 7/2014 ......... G06F 3/04883

OTHER PUBLICATIONS

U.S. Appl. No. 15/233,453, Jul. 27, 2017, Office Action.
U.S. Appl. No. 15/233,453, Dec. 19, 2017, Office Action.
U.S. Appl. No. 15/233,453, Apr. 18, 2018, Notice of Allowance.

*Primary Examiner* — Andrew L Tank
(74) *Attorney, Agent, or Firm* — Keller Jolley Preece

(57) ABSTRACT

The present disclosure includes methods and systems for receiving an electronic signature in an electronic document utilizing an interface area. In particular, in response to a user interaction, one or more embodiments of an electronic signature system can provide a signature overlay for capturing a signature to provide within an electronic document. For instance, an electronic signature system can detect user input of an original signature on the signature overlay and modify the original signature entered on the signature overlay so that the modified signature fits within a bounded area of an electronic document.

20 Claims, 11 Drawing Sheets

(56) References Cited

U.S. PATENT DOCUMENTS

| | | | |
|---|---|---|---|
| 2012/0303962 A1* | 11/2012 | Ghani | G06F 17/243 |
| | | | 713/176 |
| 2014/0019855 A1 | 1/2014 | Kim et al. | |
| 2015/0071505 A1* | 3/2015 | Kim | G06F 3/04883 |
| | | | 382/119 |
| 2015/0086114 A1* | 3/2015 | Todeschini | G06K 9/00 |
| | | | 382/189 |
| 2015/0153893 A1* | 6/2015 | Park | G06F 3/0488 |
| | | | 345/173 |
| 2016/0012315 A1* | 1/2016 | Perrin | G06K 9/00409 |
| | | | 382/161 |
| 2016/0042165 A1* | 2/2016 | Nicholson | G06F 21/32 |
| | | | 726/19 |
| 2016/0179777 A1 | 6/2016 | Zhang et al. | |
| 2016/0180160 A1* | 6/2016 | VanBlon | G06F 3/04883 |
| | | | 382/189 |

\* cited by examiner

CAPTURING ELECTRONIC SIGNATURES USING AN EXPANDED INTERFACE AREA

BACKGROUND

1. Technical Field

One or more embodiments of the present disclosure relate generally to obtaining electronic signatures. More specifically, one or more embodiments relate to systems and methods for capturing an electronic signature using an interface area.

2. Background and Relevant Art

Individuals and businesses increasingly use electronic documents in day-to-day affairs, including contracts, enrollment forms, agreements, acknowledgments, or verifications. As the prevalence of electronic documents continues to increase, so does the need to collect electronic signatures to include within the electronic documents. In the past, to input an electronic signature into an electronic document, many users would perform a manual process that would include printing the electronic document, signing the printed document, and scanning an image of the printed document that included their signature. This manual process, however, requires access to external components (e.g., a printer and a scanner) that are often not available in today's increasingly mobile environment. Moreover, the manual process is time-consuming, labor-intensive, and often results in a scanned image of the document that has an unprofessional appearance.

To avoid the problems associated with a manual signature process, conventional electronic signature capturing systems provide various methods to obtain and include electronic signatures in electronic documents without printing, signing, and scanning. For example, in some conventional signature capturing methods, the user adopts an electronic signature using a range of predefined font types. Most predefined font types, however, fail to approximate the user's actual signature. Users often prefer the unique style and characteristics of their own signature, and are, thus, often dissatisfied with the electronic signature that results from using a predefined font type.

To provide a more personalized electronic signature, other conventional signature capturing methods allow a user to draw a freehand version of the user's signature (e.g., using an input device such as mouse, trackpad, or touchscreen) within an electronic document. For instance, electronic documents often include a bounded area (e.g., a defined signature input area) wherein a user can input an electronic signature. When inputting an electronic signature in a bounded area, however, a user commonly provides user input outside of the bounded area (e.g., the user draws a portion of the user's signature outside of the bounded area). Unfortunately, user input provided outside of the bounded area is not captured, and therefore, the user input is "clipped," producing an incomplete resultant electronic signature. To avoid this result, users can carefully and slowly provide a signature to attempt to stay within the bounded area, which again changes the appearance of the resultant electronic signature.

Moreover, some users lack the physical dexterity to enter a signature within a bounded area using common digital input devices (e.g., a mouse, trackpad, or touchscreen). For example, individuals with hand or arm maladies, individuals that are not practiced at using a mouse or trackpad, or individuals with large fingers using a touchscreen commonly have difficulty exercising sufficient control to enter electronic signatures within a bounded area. Accordingly, conventional signature capturing methods often result in incomplete signatures, signatures that do not reflect the users' actual signature appearance, or both. Any of these results create user frustration and dissatisfaction.

Other conventional signature capturing methods have sought to resolve the problems that users encounter when inputting an electronic signature within a bounded area. For example, some conventional methods have increased the size of the bounded area in the electronic document. Providing a larger bounded area, however, alters the appearance of the electronic document, places undue emphasis on the signature, and devotes unnecessary document space to the signature within the electronic document. Other conventional methods provide a separate signature window (e.g., a separate dialog window) within which a user can input a signature. Providing a separate signature window, however, can interrupt or complicate the signature process. Moreover, even with a larger bounded area or a separate signature window, the user can still provide input outside the bounded area or signature window that results in a clipped or incomplete signature.

These and other problems exist with regard to collecting electronic signatures in electronic documents.

BRIEF SUMMARY

One or more embodiments of the present disclosure provide benefits and/or solve one or more of the foregoing or other problems in the art with systems and methods that allow a user to accurately and efficiently provide an electronic signature within a bounded area (e.g., a signature field) of an electronic document. In particular, one or more embodiments provide systems and methods that capture a user's signature using an interface area. For example, one or more embodiments provide a signature overlay (e.g., an enlarged area that captures user input beyond the bounded area). A signature overlay allows a user to freely input an electronic signature using one or more input devices without having to adjust for the limited input area of a bounded area. Moreover, upon the signature overlay capturing a user's signature, one or more embodiments disclosed herein include systems and methods for modifying the size and/or position of the captured signature to create an electronic signature that fits within a bounded area of an electronic document. Thus, one or more embodiments provide systems and methods that allow a user to quickly and intuitively provide an accurate representation of the user's signature to include within a bounded area of an electronic document.

Additionally, in one or more example embodiments, the present systems and methods detect a user interaction that indicates the user seeks to enter a signature in a bounded area (e.g., a user can provide a touch gesture within the bounded area). In response to detecting the user interaction, the systems and methods can provide a signature overlay that is larger than the bounded area and positioned so that the signature overlay covers the bounded area as well as an area outside of the bounded area. Due to the signature overlay being larger than the bounded area, a user can freely provide the user's signature on the signature overlay without the size constraints of the bounded area. The systems and methods can then receive user input representative of the user's signature on the signature overlay, and generate an original signature based on the user input. Furthermore, systems and methods can then modify the original signature to generate an adjusted signature, and provide the adjusted signature within the bounded area.

Accordingly, example embodiments of the systems and methods disclosed herein allow a user to more easily enter a complete electronic signature into a bounded area within an electronic document by capturing portions of the electronic signature that would have otherwise fallen outside of the bounded area, and thus would have not been included in the resultant electronic signature. One or more embodiments disclosed herein include systems and methods that simplify entry of an electronic signature reflecting a user's actual signature by eliminating the need for the user to slow down or alter the user's typical drawing pattern to fit within the bounded area. Similarly, users with less dexterity in manipulating a digital input device can more easily enter a signature reflecting their actual signature.

Furthermore, example embodiments of the systems and methods disclosed herein allow the user to easily provide an accurate electronic signature using any number of commonly available input devices (e.g., mouse, trackpad, touchscreen), thus eliminating a need for external components or processes (e.g., printing or scanning) In addition, example embodiments of the present disclosure include systems and methods that allow an electronic document to maintain a traditional or expected amount of space devoted to the signature by eliminating the need to enlarge a bounded area for purposes of receiving an electronic signature. Similarly, example embodiments of the present disclosure include systems and methods that offer an intuitive and natural process for capturing an electronic signature by providing a seamless transition between a user initiating the input of an electronic signature within a bounded area of an electronic document and the user completing the electronic signature using a signature overlay, as will be explained in detail below.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
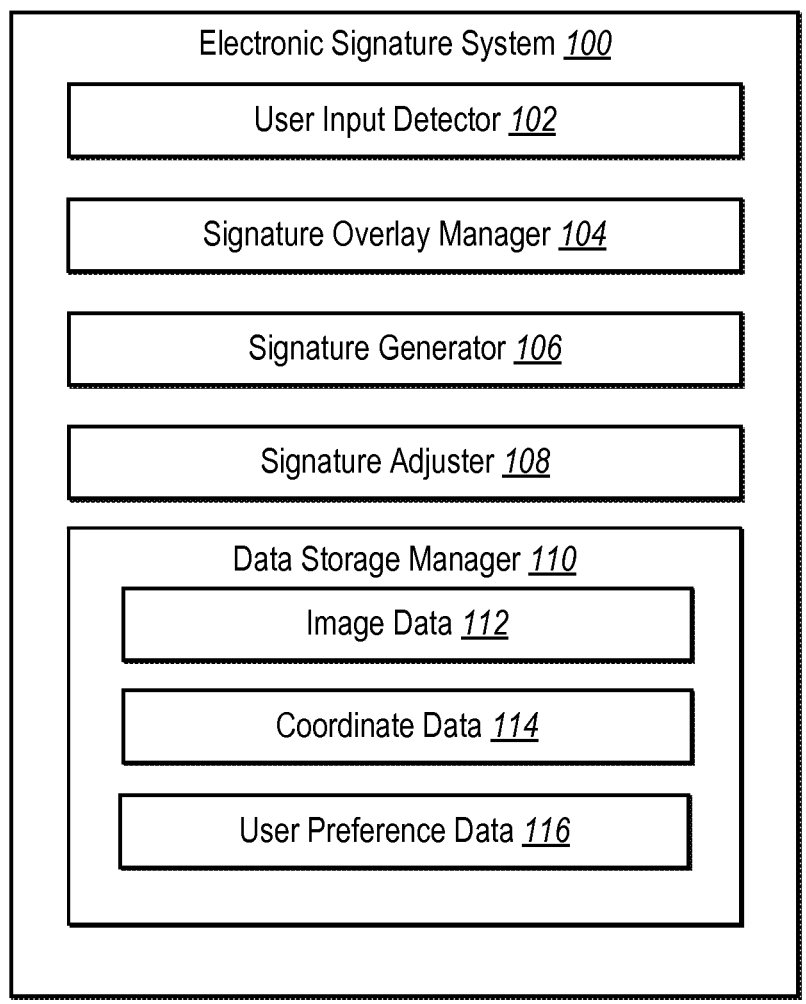
FIG. 1 illustrates an electronic signature system in accordance with one or more embodiments.

One or more embodiments of the present disclosure include an electronic signature system that allows a user to easily sign an electronic document with an electronic signature that accurately reflects the user's actual signature. In particular, in one or more embodiments, the electronic signature system detects a user interaction with a bounded area of an electronic document that indicates a user wants to provide a signature in the bounded area. In response, the electronic signature system can provide an interface area (such as a signature overlay) having a signature capture area that is larger than the bounded area and positioned so that the interface area encompasses the bounded area. The interface area can receive user input representative of the user's signature, provided by the user via an input device (e.g., mouse, trackpad, touchscreen), and generate an original signature within the signature capture area of the signature overlay. Additionally, in one or more embodiments, the electronic signature system can modify the original signature to an adjusted signature and provide the adjusted signature within the bounded area.

To assist a user in quickly and intuitively signing an electronic document, in one or more embodiments, the electronic signature system can detect when a user interacts with a signature portion of the electronic document. Particularly, the electronic signature system can provide a signature overlay after detecting user interaction with a bounded area in an electronic document. For example, the electronic signature system can detect a mouse press event occurring within a bounded area, and in response to this user interaction, the electronic signature system can provide a signature overlay to capture user input of a signature. Thus, the electronic signature system can provide the benefits of a signature overlay having a larger signature capture area in a seamless and intuitive manner that does not interrupt the natural process of the user inputting an electronic signature within an electronic document.

In order to further provide a seamless and intuitive signature process, one or more embodiments of the electronic signature system can provide an implicit signature overlay (e.g., a signature overlay that is transparent or otherwise unnoticeable by a user). An implicit signature overlay provides the user with the benefit of a larger signature capture area without any unnecessary interaction or distraction. In another embodiment, the electronic signature system can provide an explicit signature overlay (e.g., semitransparent, translucent, opaque or otherwise noticeable by a user), which allows the user to see a larger signature capture area available beyond the bounded area.

Some embodiments of the electronic signature system can provide a graphical representation of a user's signature as the electronic signature system captures user input (e.g., signature input) using a signature overlay. Therefore, even when a user exceeds the area constraints of a bounded area, the electronic signature system can render the entirety of the user's signature input (e.g., including the portions of the signature input provided to areas outside of a bounded area) to indicate to the user that the electronic signature system is capturing the user's complete signature. In such embodiments, a user can intuitively understand that the signature capture area is larger than the bounded area, and thus, the user will not feel a need to slow down or alter their signature in an attempt to keep signature input only within the bounded area.

In addition to providing a graphical rendering of a user's signature, one or more embodiments of the electronic signature system can detect completion of an original signature on the signature overlay in order to provide additional processing of the original signature, if necessary, and as described below. In particular, in one or more embodiments, the electronic signature system can detect that the user has completed a signature after detecting the passage of a defined time period since the last detected user input. For example, upon detecting signature input from an input device (e.g., upon detecting a mouse press), the electronic signature system can continue to capture signature input until determining that a defined time period has expired since receiving any additional signature input (e.g., a release of the mouse and the absence of an additional press by the user for the defined time period). The defined time period can include an amount of time sufficient to allow a user to release and re-press the mouse when drawing multiple parts of a signature (e.g., transitioning from a first name to a last name, or transitioning to dot an "i" or cross a "t") while also seamlessly detecting the completion of a signature.

Upon detecting the completion of a signature, and as mentioned previously, one or more embodiments of the electronic signature system can modify an original signature to generate an adjusted signature. For example, the electronic signature system can resize an original signature captured on a signature overlay to a size that can fit within a bounded area of an electronic document. Additionally, the electronic signature system can relocate or reposition an original signature captured on a signature overlay to a location or position within a bounded area of an electronic document. Modifying an original signature to create an adjusted signature allows the user to input a signature with the user's normal signature style on a signature overlay, as well as provide an adjusted signature that provides an appropriate signature size and position in relation to the surrounding context of the electronic document.

Furthermore, some embodiments of the electronic signature system can modify the size and/or position of a signature while independently managing the thickness of a signature drawing line. Thus, the electronic signature system can maintain a stylistic thickness of a signature drawing line, even though the electronic signature system modifies the signature itself to fit within a bounded area. In other example embodiments, the electronic signature system can modify or scale the signature drawing line. For example, where a bounded area is particularly small, the electronic signature system can modify the drawing line thickness to avoid providing an adjusted signature that is distorted or unrecognizable.

In one or more embodiments, the electronic signature system disclosed herein can facilitate the collection of an electronic signature with minimal interruption to the user's experience. Some embodiments can provide a signature overlay upon detection of a user interaction with a bounded area; begin collection of user input of a user's signature based on the same user interaction; provide the signature overlay in such a manner that is not apparent to the user; detect that a user has completed a signature; and, in response to the user completing the signature, resize and relocate the signature to fit within a bounded area. Thus, in some embodiments, the systems and methods can detect, capture, and adjust a signature entered outside the special constraints of a bounded area without any unnecessary interruption to the user's utilization of the electronic document.

As used herein, the term "electronic signature" or "signature" refers to any distinctive mark intended as a form of identification or authorization in an electronic document. In particular, the term "signature" can include any digital drawing, point, line, curve, or image that an individual or entity intends to adopt as a form of identification or authorization. For example, an individual may often choose to adopt as their "signature" a distinctive drawing of the individual's name, title, initials, or moniker entered by a computer input device. Other individuals may choose to adopt a digital mark or image, or a set of digital lines and curves that are not easily recognizable as any particular word, name, or letter.

As used herein, the term "interface area" refers to an area used to capture user input. The specific type of interface area can vary from one embodiment to the next depending on, for example, programming language, type of application, software characteristics, operating environment, or other factors. In general, an interface area provides a signature capture area that is larger than an input area associated with a bounded area of an electronic document. For example, an interface area can include, but is not limited to, a signature overlay, a signature underlay, or any other user interface component capable of capturing user input. As used herein, the term "signature overlay" refers to an interface area that is provided in front of one or more user interface components (e.g., positioned over one or more user interface components). For example, a signature overlay can include a signature capture area within which a user's signature input can be detected, recorded, and/or otherwise captured to generate an electronic signature to include in an electronic document. As used herein a "signature underlay" refers to an interface area provided behind one or more user interface components (e.g., positioned under one or more user interface components).

The term "electronic document" refers to any form of electronic content, regardless of form. For example, an electronic document can include electronic files in the form of a word processing document, a .pdf file, an image file, an e-mail file, a text file, a web page, or any other electronic file. As mentioned above, an electronic document can include a bounded area.

As used herein, the term "bounded area" refers to an input component within an electronic document that is geometrically constrained (e.g., constrained by size and/or shape). An example of a bounded area would be a signature field or signature box within an electronic document that allows a user to provide signature input. The bounded area need not be visibly constrained within the electronic document. For example, the bounded area can be an input component constrained by boundaries that are not rendered within the electronic document. Alternatively, the bounded area can be an explicitly defined area in an electronic document that is enclosed by text, lines, drawings, or some other indication that a signature or drawing should be entered within the defined area. For example, a signature box or, alternatively, a signature line with other text above and below the line.

Furthermore, the term "user interaction," as used herein, refers to conduct performed by a user to control the function of a computing device. In particular, a user can interact with a computing device using any number of input devices. For example, a user interaction can include pressing or moving a mouse, providing a touch gesture on a touchscreen, providing a touch gesture to a touchpad, or any other conduct performed by a user in the course of interacting with a computing device. In many cases a user interaction can be associated with any number of graphical user interface elements or other components displayed by way of a display screen (e.g., using an input device to select a graphical user interface element).

The term "user input," as used herein, refers to input data generated in response to a user interaction. In particular, user input can be generated based on a user interaction with an input device. For example, user input can be generated in response to one or more user interactions (in combination or in isolation) directed toward one or more interface areas. In one or more embodiments, for example an input device can be used to detect one or more user interactions that generate user input that includes, but is not limited to, a press event (e.g., a mouse button press), a movement event (e.g., a mouse movement), and/or a release event (e.g., a mouse button release). For example, a user can interact with a bounded area in an electronic document by providing a touch gesture to an area of a touchscreen associated with the bounded area, which in turn generates user input that indicates that the user seeks to enter a signature in the bounded area. In addition, the user's same touch gesture within the bounded area can also initiate signature input (e.g., the starting point of a signature) used to generate an electronic signature.

Finally, as used herein, the terms "render" or "rendering" refers to generating a visual representation of electronic content within a graphical user interface. For example, rendering can include generating a line within a graphical user interface based on user input provided by a user via an input device. In particular, based on user input, rendering can include generating a representation of a user's signature.

FIG. 1 illustrates an embodiment of an exemplary electronic signature system 100. The electronic signature system 100 may include, but is not limited to, a user input detector 102, a signature overlay manager 104, a signature generator 106, a signature adjuster 108 and a data storage manager 110. The data storage manager 110 may include, but is not limited to image data 112, coordinate data 114, and user preference data 116. Each of the components 102-110 of the electronic signature system 100 can be in communication with one another using any suitable communication technologies.

It will be recognized that any of components 102-110 may be combined into fewer components, such as into a single component, or divided into more components as may serve a particular embodiment. The components 102-110 can comprise software, hardware, or both. For example, the components 102-110 can comprise one or more instructions stored on a computer-readable storage medium and executable by processors of one or more computing devices. When executed by the one or more processors, the computer-executable instructions of the electronic signature system 100 can cause the computing device(s) to perform the signature capture methods described herein. Alternatively, the components 102-110 can comprise hardware, such as a special purpose processing device to perform a certain function or group of functions. Additionally or alternatively, the components 102-110 can comprise a combination of computer-executable instructions and hardware.

Furthermore, the components 102-110 of the electronic signature system 100 may, for example, be implemented as a stand-alone application, as a module of an application, as a plugin for applications, as a library function or functions that may be called by other applications, and/or as a cloud-computing model. Thus, the components of the electronic signature system 100 may be implemented as a stand-alone application, such as a desktop or mobile application. Furthermore, the components of the electronic signature system 100 may be implemented as a web-based application hosted on a remote server. Alternatively or additionally, the components of the electronic signature system 100 may be implemented in any electronic document application, including but not limited to ADOBE ACROBAT, ADOBE FILL & SIGN, or ADOBE ECHOSIGN. "ADOBE" "ACROBAT," "FILL & SIGN," and "ECHOSIGN," are trademarks of Adobe Systems Incorporated.

As mentioned above, and as illustrated in FIG. 1, the electronic signature system 100 may include a user input detector 102. The user input detector 102 can detect, identify, monitor, receive, process, capture, and/or record user input of various types of information or data. The user input detector 102 can operate in conjunction with any number of components of a graphical user interface to receive user input, including user input provided through a bounded area, a button, an electronic document, a signature overlay, or other elements.

Specifically, the user input detector 102 can detect user input based on a user interaction indicating a desire to enter an electronic signature. For example, the user input detector 102 can detect a finger pressing a touchscreen on a tablet in the location of a bounded area within an electronic document being shown on the tablet, and in response, determine that the user seeks to enter a signature.

Similarly, the user input detector 102 can detect, identify, receive, process, and capture user input of an electronic signature (e.g., signature input) on a signature overlay. For instance, the user input detector 102 can detect one or more press events, one or more movement events, and one or more release events. By way of example, the user input detector 102 can detect one or more input events as a user draws a signature with an input device in communication with a computing device.

Furthermore, when a user has completed input of an electronic signature, the user input detector 102 can detect a user interaction indicating that the user has finished entry of the electronic signature. Specifically, the user input detector 102 can detect user interaction with a button, a bounded area, or some other component of a graphical user interface indicating that the user has finished entry of an electronic signature. Moreover, in the event the user wishes to modify the electronic signature, the user input detector 102 can also detect and identify user interactions indicating that the user seeks to re-enter a signature, alter the appearance of the signature (e.g., change the dimensions of the signature), or otherwise modify the signature.

In addition to affirmative user interactions, as described above, the user input detector 102 can also detect and identify a lack of user input. In particular, the user input detector 102 can determine that a user has completed entry of an electronic signature by detecting a lack of user interaction for a defined period of time. For example, where a user has input a signature using a stylus on a touchscreen, the user input detector 102 can determine an absence of an input event (e.g., a user moving a stylus on the touchscreen) for a defined period of time, and in response, the user input detector 102 can determine that the user has completed signature input.

The user input detector 102 can operate in conjunction with any number of user input devices or computer devices (in isolation or in combination), including personal computers, laptops, smartphones, tablets, touchscreen devices, personal digital assistants, mouse devices, keyboards, trackpads, or stylus devices. Moreover, the user input detector 102 can detect and identify various types of user input events from user input devices, such as mouse press events, mouse drag events, mouse scroll-wheel events, touch gestures, and so forth. Furthermore, the user input detector 102 can detect or identify user interaction with a digital component in any form, such as selection of a button, a drag event within a digital component, or a particular touch gesture directed to a particular graphical element.

Additionally, or in the alternative, the user input detector 102 can detect user input directly from the user input device. In embodiments where the user input detector 102 detects user input directly from a user input device, the user input detector 102 can provide the user input to another component of the electronic signature system 100 to generate an electronic signature that fits within a bounded area. For example, the user input detector 102 can detect a user interaction with a bounded area and, upon detecting the user interaction, begin collecting user input from a user input device (rather than a component, such as a bounded area or a signature overlay). The user input detector 102 can provide user input received from a user input device to the signature generator 106 to generate a signature. As described in detail below, the signature adjuster 108 can modify the signature to fit within a bounded area. In embodiments where the user input detector 102 detects user input directly from a user input device, the electronic signature system 100 is not constrained by the boundaries of any component or device.

In addition to detecting and providing user input from an input device, the user input detector 102 can provide user input data to, or receive user input from, other components of the electronic signature system 100. For example, the user input detector 102 can provide user input to the data storage manager 110 to record, such as recording signature input of an electronic signature for modification, storage, or future use. The user input detector 102 can provide user input data to the signature overlay manager 104, for example, so that the signature overlay manager 104 can generate a signature overlay or remove a signature overlay (as will be discussed further below). Additionally, the user input detector 102 can provide user input to the signature generator 106, for example, so that the signature generator 106 can render a signature drawn by a user on the signature overlay for presentation to a user via a graphical display (as discussed in detail below). Moreover, the user input detector 102 can provide user input to the signature adjuster 108. For example, the user input detector 102 can provide user input indicating that the user seeks to manually modify a signature (e.g., manually adjust the size and or position of a signature relative to a bounded area).

As further illustrated in FIG. 1, the electronic signature system 100 may also include an interface area manager to manage one or more interface areas. For purposes of explanation, the interface area manager will be described in terms of a signature overlay manager 104, as shown in FIG. 1. The signature overlay manager 104 can provide one or more signature overlays having one or more signature capture areas used to capture user input associated with a user's electronic signature. In particular, in one or more embodiments the signature overlay manager 104 creates a signature overlay to capture a user's original signature. The signature overlay manager 104 can create and manage a signature overlay that captures a user's original signature specific to a variety of platforms, applications, interfaces, or operating systems, depending on a particular embodiment.

In one or more embodiments, the signature overlay manager 104 can generate a signature overlay in response to one or more user interactions. In particular, the signature overlay manager 104 can generate a signature overlay upon receiving an indication of a user interaction (e.g., from the input detector 102) with a component of an electronic document, such as a button, a bounded area, or other component. For example, the signature overlay manager 104 can generate a signature overlay upon a tap-gesture event (e.g., on a touchscreen) or a mouse-press event within a bounded area of an electronic document.

The input event that causes the signature overlay manager 104 to create a signature overlay can vary from embodiment to embodiment. For example, in one embodiment the signature overlay manager 104 can create a signature overlay when the user causes a press event (e.g., a touch gesture or mouse-press) within a bounded area. In other embodiments, the signature overlay manager 104 can create the signature overlay after the user provides a specified amount of movement associated with a movement event in entering a signature (e.g., when the user begins to input a signature with a user input device). Alternatively, the signature overlay manager 104 can create the signature overlay when the user comes close to the edge of a bounded area or when the user first attempts to cross the edge of a bounded area.

In other embodiments, the signature overlay manager 104 can create the signature overlay after a first release event. For example, in one or more embodiments, a user interaction can provide a press event within a bounded area of an electronic document, after which the user continues to interact and begins to input a signature within the bounded area. In such a case, the signature overlay manager 104 can create a signature overlay after the user inputs a first portion of the signature and then causes a release event (e.g., the user lifts the user's finger from a touchscreen to transition to a second portion of the signature). Thus, a first portion of signature input is provided with respect to the bounded area, and then after the release event, the signature overlay manager 104 provides a signature overlay and a second portion of signature input is provided with respect to the signature overlay, as will be discussed in additional detail below.

Because a user typically enters an electronic signature in a relatively short amount of time, the signature overlay may be a temporary input component. Thus, in addition to providing a signature overlay, the signature overlay manager 104 can also remove a signature overlay. For instance, in response to the user input detector 102 determining that the user has completed the input of a signature on the signature overlay, the signature overlay manager 104 can remove the signature overlay, enabling the user to interact with other components of the electronic document or graphical user interface previously covered by the signature overlay.

The signature overlay manager 104 can remove the signature overlay based on a user interaction, or a lack of user interaction. In one or more embodiments, systems or methods can provide a button or other selectable component, which when selected, indicates that the user has concluded signature input thus prompting the signature overlay manager 104 to remove the signature overlay. Alternatively, the signature overlay manager 104 can receive from the user input detector 102 information indicating a lack of user input for a defined period of time, prompting the signature overlay manager 104 to remove the signature overlay.

Notwithstanding the various ways in which the signature overlay manager 104 can create and remove a signature overlay, the signature overlay manager 104 can create a signature overlay having a variety of characteristics. For example, a signature overlay can vary in geometric size (e.g., the geometric dimensions on a display device) from one embodiment to the next. For example, the signature overlay manager 104 can create a signature overlay that encompasses the entire area of a graphical user interface, the entire area of a display screen, or any smaller area thereof. In embodiments where the electronic signature system 100 interacts with an electronic document using a graphical user interface, the signature overlay manager 104 can create a signature overlay that it is smaller than, the same size as, or larger than the graphical user interface.

The signature overlay manager 104 can determine the size of a signature overlay based on a characteristic of a computing device; user preferences; a particular application, program, or plugin; characteristics or components of a graphical user interface; characteristics or components of an electronic document; characteristics of prior signatures input by a user; characteristics of a user; or other information.

For example, the signature overlay manager 104 can determine the size of the signature overlay based on the size of a bounded area in an electronic document, the size of a graphical user interface, the size of a display screen displaying the signature overlay, or the size of an electronic document. Moreover, in one or more embodiments the signature overlay manager 104 can determine the size of a bounded area in the electronic document and generate a signature overlay such that the overlay provides a signature capture area that is sufficiently larger than the bounded area to permit easy entry of an electronic signature.

In one or more embodiments, the signature overlay manager 104 can identify a dimension(s) of one or more digital components and generate a signature overlay in relation to, or based on, the dimensions of the one or more graphical components. For example, the signature overlay manager 104 can identify the dimensions of a bounded area, electronic document, dialogue box, graphical user interface, display device, or some other component, and generate a signature overlay based on the identified dimensions. In addition, the signature overlay manager 104 can identify dimensions associated with a combination of graphical components to determine a size of a signature overlay.

Based on identifying a dimension associated with a graphical component, the signature overlay manager 104 can use the identified dimension in a variety of ways to calculate or otherwise determine the size of the signature overlay. For example, in one or more embodiments, the signature overlay manager 104 can add a specified geometric value (e.g., a length and/or width value) to a component's dimensions to determine a size of a signature overlay. In addition, or alternatively, the signature overlay manager 104 can multiply the dimensions of a component by a determined or predetermined factor. In other example embodiments the signature overlay manager 104 can determine a difference between two separate components' dimensions, averaging, multiplying, and/or dividing the dimensions of multiple components, or otherwise creating a signature overlay based on the dimensions of one or more components.

To illustrate, the signature overlay manager 104 can determine the dimensions of the bounded area in an electronic document and create a signature overlay with dimensions that are double the dimensions of the bounded area. Alternatively, the signature overlay manager 104 can create a signature overlay with a height that is four times as large as the height of a bounded area and a width that is twice the width of the bounded area. Moreover, the signature overlay manager 104 can identify the dimensions of a bounded area within an electronic document, identify the dimensions of a graphical user interface displaying the electronic document, and generate a signature overlay with dimensions that are the average of the dimensions of the bounded area and graphical user interface. Similarly, the signature overlay manager 104 can identify that the user is inputting a signature using a particular computing device with a known display screen size, and based on the device type and/or known display screen size, generate a signature overlay that fills a certain portion of the display screen. For instance, the signature overlay may fill an entire display screen upon determining the user is utilizing a small touchscreen on a mobile device (e.g., a smart phone).

As briefly mentioned above, the signature overlay manager 104 can also determine the geometric size of a signature overlay based on user preferences, user characteristics, or prior user interactions. In particular, in one or more embodiments the signature overlay manager 104 can determine the size of a signature overlay based on a user's demographic information (such as age), the size of a user's finger, the size of prior signatures, or other information. For example, the signature overlay manager 104 could determine the size of a prior user's signature and provide a signature overlay that is larger than the prior signature so that the user has sufficient space to enter the signature within the signature capture area of the signature overlay. Similarly, if a user has previously exceeded the size of a signature overlay in drawing a signature, the signature overlay manager 104 can provide a larger signature overlay in response.

In addition to variations in the geometric size of a signature overlay, the signature overlay manager 104 can create a signature overlay having various geometric shapes. For example, a signature overlay can be in the shape of a rectangle, circle, oval, frame, ring, donut, or some other geometric shape. The signature overlay manager 104 can determine the shape of the signature overlay based on the computing device; user preferences; the particular application, program, or plugin; characteristics or components of the graphical user interface; characteristics or components of the electronic document, characteristics of a bounded area, the display device, or some other information.

Aside from various geometric shapes, the signature overlay manager 104 can also provide a signature overlay with one or more visual characteristics. In particular, the signature overlay manager 104 can vary the color, transparency, background, border, texture, effects, or other visual characteristics of the signature overlay. The signature overlay manager 104 can also generate a signature overlay containing an image, brand, logo, trademark, advertisement, or text.

In one or more embodiments, for example, the signature overlay manager 104 can generate a semi-transparent signature overlay with a solid border and text to provide the user with an indication of the signature capture area available on the display screen. Alternatively, the signature overlay manager 104 can generate a signature overlay that is completely transparent and imperceptible to the user. Moreover, the signature overlay manager 104 can generate a signature overlay that is opaque, or a signature overlay that includes a trademark and color scheme applicable to a particular client or application developer.

The signature overlay manager 104 can vary the visual characteristics of a signature overlay based on one or more of a variety of factors. For example, the signature overlay manager 104 can vary the visual characteristics of a signature overlay based on device type, client preference, characteristics of an electronic document, a program or application associated with an electronic document (e.g., a word processor or PDF reader), or the operating environment. For example, in the event an electronic document contains other text, images, marks, or drawings in close proximity to (or even overlapping) the bounded area, the signature overlay manager 104 can provide a signature overlay that is less transparent and more visible to make clear to the user that an enlarged signature capture area is available. Similarly, if a user is operating a consumer transaction device where the bounded area for a signature is prominent and isolated in the electronic document, the signature overlay manager 104 can provide a signature overlay that is transparent or substantially transparent.

The signature overlay manager 104 can also determine one or more visual characteristics of a signature overlay based on one or more user characteristics or preferences. For example, the signature overlay manager 104 can generate a signature overlay containing an advertisement on the signature overlay based on the user's prior usage history, location, or demographic information. Similarly, the signature overlay manager 104 can determine transparency, color, and other characteristics of a signature overlay based on user preferences that a user can provide to the electronic signature system 100 (e.g., by selecting preferences from a preferences menu).

In addition to providing a signature overlay with a variety of visual characteristics, the signature overlay manager 104 can also provide a signature overlay in varying positions or locations with respect to the various graphical elements. For example, the signature overlay manager 104 can locate the signature overlay with regard to a graphical user interface, an electronic document, a device type, a component or characteristic of a graphical user interface, a component or characteristic of an electronic document, or some other reference point on a graphical display. For example, the signature overlay manager 104 can position the signature overlay so that it is centered over a bounded area within an electronic document.

In another example embodiment, however, the signature overlay manager 104 can offset the position of a signature overlay with respect to a bounded area. For example, if users tend to exceed the right edge of a bounded area more often than the left edge of a bounded area, the signature overlay manager 104 can position the signature overlay so that a left edge of the signature overlay is substantially aligned with a left edge of the bounded area, while a right edge of the signature overlay extends beyond a right edge of the bounded area. In other embodiments, the signature overlay manager 104 can locate the signature overlay based on the location of a graphical user interface, and independent of the bounded area. Alternatively, or in addition, the signature overlay manager 104 can locate the signature overlay based on a combination of multiple elements or characteristics.

In one or more embodiments, for example, the signature overlay manager 104 can alter or modify the characteristics of a signature overlay based on user input that a user provides with respect to a signature overlay. For example, the signature overlay manager 104 can change the geometric size or shape of a graphical representation of a signature overlay to create a signature capture area that matches signature input that a user provides with respect to the signature overlay. Specifically, the signature overlay manager 104 can provide a signature overlay having a first geometric size based on one or more dimensions of a bounded area, with the first geometric size representing an estimated area needed to capture a user signature. In the event, however, that a user exceeds the bounds of the signature overlay having the first geometric size, the signature overlay manager 104 can respond by resizing the signature overlay to a second geometric size. The second geometric size can be based on the signature input, for example, and determined to provide a signature capture area that is large enough to fully capture the signature input.

In one embodiment, the signature overlay manager 104 can provide a graphical representation indicating that the signature overlay is increasing in size, thereby giving the user the visual impression that the signature collection area will adjust depending on the amount of space needed for entry of the signature. The signature overlay manager 104 can provide a visual representation of a signature overlay that differs from the size of the actual signature overlay. For example, in one example embodiment, the signature overlay manager 104 can generate a signature overlay of a fixed size and provide a graphical representation of a signature overlay that increases in size based on user input. In another embodiment, the signature overlay manager 104 can generate a signature overlay that can change size based on user input as well as providing a representation of the signature overlay that can change in size. In another example, however, the signature overlay manager 104 can modify the geometric size of the signature overlay in a manner that is unnoticeable or undetectable to the user (e.g., in the case of a transparent signature overlay).

In addition to the above characteristics of a signature overlay, the signature overlay manager 104 can create a signature overlay that includes any number of additional graphical elements, such as lines, curves, images, points, or other graphical representations within the signature capture area. For example, the signature overlay manager 104 can provide a signature overlay that includes a brand (e.g., trademark), text, advertisement, or other marking or image. In one or more embodiments, the signature overlay manager 104 can determine what markings or images to include in a particular signature overlay based on a particular application, program, or plugin; client preferences; characteristics of the user; prior user input; prior signatures; characteristics or components of the graphical user interface; characteristics or components of the electronic document; or the characteristics or components of the computing device or user input device.

For example, if a user repeatedly inputs a signature that does not exceed a bounded area, the signature overlay manager 104 can provide text (e.g., in the form of a help tip or hint) indicating that the user can utilize the enlarged signature capture area provided by the signature overlay. As another example, the signature overlay manager 104 can provide an advertisement on the signature overlay based on the user's location. Similarly, in an electronic document with dense text around a bounded area, the signature overlay manager 104 can provide a message indicating that the user can utilize the enlarged signature capture area provided by the signature overlay, even though it may appear that the user is providing signature input on top of document text.

In addition to determining one or more characteristics of a signature overlay, the signature overlay manager 104 can also provide one or more transitional images or graphic animations as the signature overlay manager 104 creates a signature overlay, removes a signature overlay, or collects a signature. For example, the signature overlay manager 104 can provide a graphic animation to create a visual effect of the signature overlay growing out of the bounded area. Similarly, the signature overlay manager 104 can render one or more graphic animations to create a visual effect of the signature overlay disappearing back into the bounded area upon completion of a signature.

As briefly described above, the signature overlay manager 104 can operate in conjunction with the user input detector 102 and other components of the electronic signature system 100. For example, the user input detector 102 can identify a user interaction that indicates the user intends to enter an electronic signature, and in response, the signature overlay manager 104 can provide a signature overlay to capture an electronic signature. Furthermore, the user input detector 102 can detect user input (or a lack thereof) indicating that the user has completed entry of an electronic signature, and in response the signature overlay manager 104 can remove the signature overlay.

In addition to communicating with the user input detector 102, the signature overlay manager 104 can communicate with the signature generator 106 to generate a graphical representation of a user's signature (as will be described in additional detail below). The signature overlay manager 104 can also communicate with the data storage manager 110.

For example, the signature overlay manager 104 can retrieve an image from the image data 112 to render within the signature overlay, send coordinate information for storage in the coordinate data 114, or access user preference data 116 as needed. The components of the electronic signature system 100 can coordinate with other components as necessary to accomplish the objectives of the electronic signature system 100 described herein.

As mentioned above, and as shown in FIG. 1, the electronic signature system 100 can also include a signature generator 106. In one or more embodiments, a signature generator 106, creates, renders, and/or records a visual representation of a user's signature. The signature generator 106 can render a signature as part of the electronic signature system 100, including with respect to a signature overlay or with respect to a bounded area. The signature generator 106 can also record a signature as necessary for use within the electronic signature system 100.

In one or more embodiments, the signature generator 106 generates a representation of a signature based on user input captured with respect to one or more components of an electronic document, such as, for example, a bounded area and/or a signature overlay. As will be explained in further detail below, generating an electronic signature can include generating a data file that includes an electronic signature, generating a graphical visual representation of a signature, and/or appending a file or graphical representation of a signature to another data file (e.g., an electronic document). In one or more embodiments, in order to create a signature, the signature generator 106 can convert or otherwise translate user input into a series of points, lines, curves, or other graphical elements representative of signature input that a user provides. For instance, based on user interaction with respect to a signature overlay, the signature generator 106 can receive user input data from the user input detector 102 and convert the data to a series of coordinate points that, when aggregated, represent an electronic signature.

More specifically, the signature generator 106 can create a signature based on user input that the signature generator 106 receives from the user input detector 102 and/or signature overlay manager 104 (e.g., a user drawing the user's signature on a touchscreen of a computing device with respect to a signature capture area of a signature overlay). In one or more embodiments, the signature generator 106 can coordinate with various components within the electronic signature system 100, as necessary, to create an electronic signature.

In one or more embodiments, the signature generator 106 can create an electronic signature based on user input provided with respect to multiple components. In particular, the signature generator 106 can create an electronic signature based on user input provided with respect to a first component, a second component, and other components. For instance, and as briefly mentioned above, the signature generator 106 can generate an electronic signature based on user input provided with respect to a bounded area defined in an electronic document, and based on user input provided with respect to a signature overlay. For example, and as described above, because the initial user interaction (e.g., a press event followed by a drag event) may occur with respect to a bounded area component (e.g., before creation of a signature overlay component) the signature generator 106 may initially receive signature input in terms of coordinates corresponding to the bounded area component. The signature generator 106 can receive, interpret, and/or modify these coordinates from the bounded area as necessary to create, generate, or render an electronic signature.

Signature input that a user provides with respect to the bounded area component, however, may not include all of the user input to complete an electronic signature. For instance, and as described above with respect to one or more embodiments, based on a user providing a release event and then providing another press event (e.g., to complete their first name and begin their second name) the signature generator 106 may receive the subsequent signature input in terms of coordinates corresponding to the signature overlay component.

Having received coordinate data reflecting signature input with respect to both the bounded area and the signature overlay, the signature generator 106 can synchronize the coordinate data to generate a continuous electronic signature. For example, the signature generator 106 can convert the coordinates collected with reference to a bounded area component coordinate scheme to coordinates of a signature overlay coordinate scheme to generate a continuous and uniform electronic signature. In one or more embodiments, the signature generator 106 can access coordinate data 114 from the data storage manager 110 to use in converting form one coordinate scheme to another coordinate scheme. The coordinate data 114, for example, can include a relationship between two or more component coordinate schemes. Indeed, the signature generator 106 and the electronic signature system 100 can convert among and between any coordinate schemes and can convert coordinate schemes from more than two components (e.g., where the electronic signature system 100 provides multiple signature overlays).

Furthermore, the signature generator 106 can synchronize coordinate data to generate a continuous signature, regardless of source, and regardless of how many times the source of the coordinate data changes. In particular, as discussed above, the signature generator 106 can receive coordinate data from a first component, receive additional coordinate data from a second component, and then receive further coordinate data from the first component. More specifically, the signature generator 106 can receive coordinate data representative of a first portion of a signature with regard to a bounded area, can receive a second portion of a signature with regard to a signature overlay, can receive a third portion of a signature with regard to the bounded area (or some other component), and so on.

Regardless of source, the signature generator 106 can synchronize the coordinate data to generate a continuous signature. The signature generator 106 can synchronize the coordinate data in a variety of ways. In one embodiment, the signature generator 106 can convert all coordinate data received to a coordinate scheme associated with a single component. Specifically, the signature generator 106 can convert all coordinate data received to a coordinate scheme associated with a bounded area component. In other embodiments, the signature generator 106 can convert all coordinate data received to a coordinate scheme associated with a signature overlay component. In yet other embodiments, the signature generator 106 can convert coordinate data to another coordinate scheme not associated with a bounded area component or signature overlay component. Furthermore, in other embodiments, the signature generator 106 can use one coordinate scheme to accomplish a portion of its functions, and use another coordinate scheme to accomplish other functions.

Although in some embodiments the signature generator 106 receives user input representative of a signature from multiple components, in other embodiments, the signature generator 106 can generate a signature based on user input from a single component. In particular, in some embodiments the signature generator 106 can generate a signature based on user input received with respect to a bounded area component. For instance, the signature generator 106 can generate a signature based on user input received from a bounded area component, even where the user input is provided both within and outside of the bounded area component. For example, in one or more embodiments a user may begin a signature within a bounded area component and then provide user input of the signature outside of bounded area component. The bounded area component could provide coordinate data for the entire signature, including user input provided outside the bounded area component. The signature generator 106 can generate a signature based on the coordinate data provided, including coordinate data within and outside the bounded area.

Where a signature is received with respect to a bounded area component only, in some embodiments the electronic signature system 100 can provide a rendering of the signature outside of the bounded area component. For example, the signature generator 106 (in conjunction with the signature overlay manager 104) can provide an image of a signature that exceeds a bounded area by providing an image within the area of a signature overlay. Thus, the signature generator 106 can receive user input from a bounded area (where the user input is provided both within and outside the bounded area), generate an original signature based on the user input, and/or provide a rendering of the original signature utilizing a signature overlay.

In addition to generating a signature based on signature input made with respect to a single component (or multiple components), the signature generator 106 can vary the timing of creating an electronic signature, depending on the embodiment. For example, the signature generator 106 can begin creation of an electronic signature based on a first user interaction that indicates the user seeks to create a signature. In another example, the signature generator 106 can begin creation of an electronic signature after the user has drawn a specified portion of a signature (e.g., based on an amount of signature input). Moreover, the signature generator 106 can begin creation of an electronic signature after a certain amount of time has passed after the first user interaction indicating the user seeks to create a signature. In other embodiments, the signature generator 106 can begin creation of the electronic signature upon the user completing a signature (e.g., ceasing to provide user input for a defined period of time).

Regardless of the timing of the signature generation, and as briefly discussed above, the signature generator 106 can also render an image of the signature to provide visual feedback to the user regarding the appearance of the user's signature. For instance, the signature overlay manager 104 can render a signature as the signature is drawn. In other example embodiments, the signature generator 106 can render a signature with a specified amount of delay with respect to receiving signature input, or after the user has completed signature input. In addition, the signature generator 106 can render a signature upon request by the user. In one or more embodiments, the signature generator 106 does not render a user's original signature, but rather, only renders an adjusted signature after the electronic signature system has modified the original signature (e.g., modified to fit within a bounded area of an electronic document).

Notwithstanding the various times of the signature process within which the signature generator 106 can render a signature image, the signature generator 106 can provide a signature image in various display locations. In particular, the signature generator 106 can render the signature in a particular location based on characteristics or components of an electronic document, characteristics or components of a graphical user interface, computing device characteristics, input device characteristics, user preferences, user characteristics, the location of user interaction, the location of a bounded area, and/or some other characteristic or factor. For example, in some embodiments, the signature generator 106 can render the signature in the same location on a computing device display screen that coordinates to where a user interacted to input the signature. In other embodiments, the signature generator 106 can render a signature in a location above, below, to the left, or to the right of a location on the display screen where the user interacted to provide signature input. This approach may be useful, for example, on a tablet where a user's finger or arm hides a signature image while the user provides signature input. Alternatively, the signature generator 106 can render a signature in a predetermined location on a graphical user interface, allowing a user to see the appearance of the entire signature at all times (even when the person is left-handed and using a stylus, for example).

In addition to providing a signature in various locations or positions, the signature generator 106 can also generate a signature with varying visual characteristics. In particular, the signature generator 106 can generate a signature of various colors, thicknesses, styles, textures, effects, or other visual characteristics. The signature generator 106 can determine the visual characteristics based on preference of a user, characteristics of an electronic document, characteristics of a graphical user interface, characteristics of a user, type of computing device, type of input device, and/or some other factor. For example, in one or more embodiments, the signature generator 106 can create a signature image so that it appears a user has drawn the signature with a fountain pen, ballpoint pen, pencil, or some other writing instrument. For example, the signature generator 106 can alter signature color based on user selection of a certain color. Moreover, the signature generator 106 can utilize a style with the appearance of a fountain pen based on the formal style of the text within an electronic document. Similarly, the signature generator 106 can select a blue or black signature color based on a text within the document that indicates a user should sign in a particular color. In addition, where an electronic document contains a small bounded area, the signature generator 106 can select a thin signature line to avoid obscuring characteristics of the user's signature.

Furthermore, the signature generator 106 can render one or more images reflecting modification of an original signature. As discussed in greater detail below, the signature adjuster 108 can modify an original signature, including resizing, relocating, rotating, and otherwise modifying an original signature. The signature generator 106 can render one or more images regarding these modifications. For example, the signature generator 106 can provide a series of images reflecting a signature's change in size, reflecting a signature's change in location, or reflecting other modifications.

The signature generator 106 can also create a signature based on prior signatures entered by a user. In one or more embodiments, the signature generator 106 can retrieve a previously entered, rendered, or adjusted signature. For example, if a user has previously utilized the electronic signature system 100 to enter a signature within a bounded area, the signature generator 106 can retrieve the signature for entry into a bounded area so that the user need not reenter the electronic signature.

The signature generator 106 can interact with other components of the electronic signature system 100 as necessary to perform its functions. For example, if a user draws an electronic signature on a signature overlay, the user input detector 102 can gather the user input, and the signature generator 106 can generate a signature from the user input. The signature generator 106 can access user preference data 116 to determine the preferred visual characteristics when rendering a signature image. The signature generator 106 can provide pertinent signature data to the signature adjuster 108, and receive a modified signature from the signature adjuster 108 for further rendering. Moreover, the signature generator 106 can provide a signature to or receive a signature from the data storage manager 110.

As discussed above, the electronic signature system 100 may also include a signature adjuster 108. The signature adjuster 108 assists the electronic signature system 100 in modifying signatures (e.g., to fit within a bounded area of an electronic document). In particular, the signature adjuster 108 has the ability to scale, shrink, relocate, rotate, or otherwise modify a signature or portion of a signature. For example, and as mentioned above, the user can provide an original signature with respect to a signature overlay that may be larger than a bounded area designated for an electronic signature. The signature adjuster 108 can modify the original signature to create an adjusted signature that will fit within the bounded area.

In one or more embodiments, the signature adjuster 108 can scale a signature. In particular, the signature adjuster 108 can adjust one or more dimensions of a signature based on the characteristics or components of an electronic document, based on user preference, or some other factor. For example, the signature adjuster 108 can scale the dimensions of a signature such that the signature will fit within a bounded area. Similarly, the signature adjuster 108 can scale the dimensions of a signature such that the signature will fit within a bounded area and have a minimum amount of "white space" between the edge of the bounded area and any portion of the signature.

The signature adjuster 108 can adjust the dimensions of a signature independently from other dimensions, in conjunction with other dimensions, or proportionally with other dimensions. For example, the signature adjuster 108 can scale the dimensions of a signature proportionally so that the signature maintains its original proportionate appearance. Alternatively, the signature adjuster 108 can modify only the vertical dimension, or only the horizontal dimension. For example, the signature adjuster 108 can allow a user to adjust only a vertical dimension if the user prefers the appearance of a slightly taller electronic signature. Furthermore, the signature adjuster 108 can adjust vertical and horizontal dimensions to different degrees.

The signature adjuster 108 can adjust the size of a signature utilizing a variety of methods. In one embodiment, the signature adjuster 108 can adjust the size of a signature by modifying the coordinate points defining the signature. In particular, the signature adjuster 108 can divide, multiply, ad, subtract, or otherwise modify the set of coordinate points defining a signature to adjust the size. For example, to make a signature half of its size, the signature adjuster 108 can divide all coordinate points defining the signature by two. To make a signature half as tall, the signature adjuster 108 can divide the vertical coordinate points defining the signature by two. The signature adjuster 108 can also adjust the size of a signature in a variety of other ways, such as converting the signature to an image and resizing the image; resizing the lines, curves, and points defining a signature, or another method.

In addition to resizing or scaling a signature, the signature adjuster 108 can also modify the location of the signature. Specifically, the signature adjuster 108 can position the signature anywhere within an electronic document, graphical user interface, or display device. The signature adjuster 108 can determine the location of a signature based on the location of a bounded area, the location of other elements of an electronic document, or user preference. For example, the signature adjuster 108 can alter the location of a signature so that the signature horizontally and vertically aligns with the boundaries of a bounded area. For instance, the signature adjuster 108 can horizontally and vertically center an adjusted signature with respect to the boundaries of a bounded area. In one or more embodiments, the user can move an adjusted signature to a specified location.

In modifying or otherwise determining a location of the adjusted signature, the signature adjuster 108 can also determine an adjusted signature orientation in relation to the bounded area or its components. For example, the signature adjuster 108 can orient an adjusted signature within the bounded area so that it is horizontally oriented to the left, center, or right of a bounded area and/or vertically oriented to the top, middle, or bottom of a bounded area. The signature adjuster 108 can determine orientation based on characteristics of the electronic document, a baseline, a bounded area, or other components. For example, the signature adjuster 108 can orient an adjusted signature so as to align with other text margins existing in an electronic document. Similarly, the signature adjuster 108 can orient an adjusted signature based on the existence of text in close proximity to a bounded area (e.g., placing the adjusted signature closer to the bottom of a bounded area when existing text appears in the vicinity of the top of the bounded area). Moreover, the signature adjuster 108 can orient the signature so that an adjusted signature appropriately rests on a baseline (e.g., signature line) provided within the electronic document.

The signature adjuster 108 can also rotate an original signature. In particular, the signature adjuster 108 can rotate an original signature in relation to an electronic document, a graphical user interface, a component, a bounded area, a signature line, client input, a predetermine angle, or some other factor. For example, in one or more embodiments the signature adjuster 108 can rotate an original signature so that the signature aligns with a signature line within a bounded area component of an electronic document. In addition, the signature adjuster 108 can rotate an original signature so that it will better fit within a bounded area component of an electronic document. For example, in order to fit a signature that is slanted at a 45-degree angle in relation to a bounded area, the signature adjuster 108 may have to scale the signature to such an extent that the user can no longer discern the signature's unique characteristics. Accordingly, in some embodiments, the signature adjuster 108 can rotate a signature that is slanted at a forty-five degree angle (or some other angle) to align with the boundaries of the bounded area so that the signature needs less scaling to fit within the bounded area. Similarly, in other embodiments the signature adjuster 108 can rotate an original signature based on user input from the client; for example, where a client prefers a signature that is slightly tilted from horizontal.

The signature adjuster 108 can modify a signature at any point during or after user input of an original signature. The signature adjuster 108 can modify an original signature as soon as a user begins to input the signature, as the user inputs the signature, after the user has input a certain portion of the signature, after a certain amount of time has elapsed, or after the user has completed inputting the entire original signature. Similarly, the signature adjuster 108 can perform modifications in any order or sequence. Specifically, the signature adjuster 108 can scale a signature before moving, move a signature before scaling, rotate a signature before moving, rotate a signature before scaling, move and/or scale and/or rotate a signature before orienting, move and/or scale and/or rotate a signature after orienting, move and/or scale and/or rotate a signature before rendering, move and/or scale and/or rotate a signature after rendering, move and/or scale and/or rotate a signature during user drawing, move and/or scale and/or rotate a signature after user drawing, and so forth. For example, the signature adjuster 108 can move a signature so as to align with the left-most edge of a bounded area, rotate the signature to align with the bounded area, scale the signature so as to fit within the dimensions of the bounded area, and then orient the signature so that it is centered vertically within the bounded area.

Moreover, in one or more embodiments, the signature adjuster 108 can modify an original signature to fit within a bounded area while maintaining other characteristics of the original signature. In particular, the signature adjuster 108 can modify the dimensions, location, or orientation of an original signature while maintaining thickness, style, texture, color, effects, or other visual characteristics of the signature. The signature adjuster 108 can determine what visual characteristics to modify based on user preference, characteristics of the signature, characteristics of the electronic document, or other features. For example, in one or more embodiments, the signature adjuster 108 can scale an original signature to fit within a bounded area without modifying the thickness or style of the original signature line based on a preferred user preference for thickness of the line. Alternatively, the signature adjuster 108 can modify the thickness of the signature line based on the size of the bounded area.

In modifying an original signature, the signature adjuster 108 can also manage various types of coordinate data. For example, the signature adjuster 108 can convert coordinate data from one coordinate scheme to another. In one or more embodiments the signature adjuster 108 can receive a signature in terms of a series of points defined by a coordinate scheme associated with a first component and convert the series of points to a coordinate scheme associated with a second component (or third component, and so forth). In particular, the signature adjuster 108 can receive an original signature in terms of coordinate data based on a coordinate scheme associated with a signature overlay component and convert the coordinate data to a coordinate scheme associated with a bounded area component (or vice versa).

The signature adjuster 108 can convert coordinate data from one coordinate scheme to another coordinate scheme (or a third or fourth coordinate scheme) at any point in modifying an original signature. For example, the signature adjuster 108 can convert coordinate data from one coordinate scheme to another coordinate scheme before modifying an original signature, after resizing an original signature, after relocating an original signature, after orienting an original signature, after completing modifications to an original signature, or at any other time.

The signature adjuster 108 can also determine one or more required characteristics for a final signature. Required characteristics can comprise the various modifications to an original signature just discussed or any other required characteristics. The signature adjuster 108 can determine required characteristics based on characteristics of an electronic document, characteristics of a component, characteristics of a bounded area, characteristics of a device, characteristics of a device display, or client input. For example, the signature adjuster 108 can determine the required size of a final signature based on the dimensions of a bounded area. Similarly, the signature adjuster 108 can determine the required style of the final signature based on user preferences. The signature adjuster 108 can modify an original signature based on the one or more required characteristics of the final signature.

The signature adjuster 108 can operate in conjunction with other components of the electronic signature system 100 as necessary to perform its functions. For example, the signature adjuster 108 can receive user input from the user input detector 102 to modify a signature (e.g., scale or move a signature according to manual input from the user). Moreover, the signature adjuster 108 can receive signatures from the signature generator 106 or send adjusted signatures to the signature generator 106. Similarly, the signature adjuster 108 can store or retrieve adjusted signatures from image data 112, can store and retrieve information from coordinate data 114, or access information from user preference data 116. In addition, the signature adjuster 108 can detect one or more required characteristics of a final signature from user preference data 116 or some other component.

The electronic signature system 100 can also include a data storage manager 110 to facilitate storage of information in the electronic signature system 100. In particular, the data storage manager 110 can store information used by one or more components of the electronic signature system 100 to facilitate the performance of various operations associated with the electronic signature system 100. In one or more embodiments, as shown in FIG. 1, the data storage manager 110 maintains image data 112, coordinate data 114, and user preference data 116. The data storage manager 110 may also store any additional or alternative information corresponding to the operation of the electronic signature system 100. The data storage manager 110 can maintain additional or alternative data as may serve a particular implementation. The data storage manager 110 may communicate with any component within the electronic signature system 100 to obtain or share information for capturing an electronic signature. In one or more embodiments, the data storage manager 110 includes one or more servers on which various types of data are stored. For example, the data storage manager may include or may be implemented in a data storage environment.

In one or more embodiments, the data storage manager can include image data 112. The image data 112 can include images for use in conjunction with the electronic signature system 100. In particular, the image data 112 can include any point, line, curve, or image (in conjunction or in isolation) needed for operation of the electronic signature system 100, including an original or adjusted signature, advertising content, trademark images, branding images, text, transitional images, signature overlay graphics, or any other image information. For example, image data 112 can include an image that the user, client, or application wishes to present within the signature overlay, such as a brand mark. The image data 112 can include images for use in various renderings, including the signature overlay, buttons or components. Similarly, the image data 112 can store original or altered signatures for later user in the electronic signature system 100.

In addition to image data 112, the data storage manager 110 can also include coordinate data 114. The coordinate data 114 records information related to the spatial location of user input or digital components. In particular, coordinate data 112 can include user input data from a user input device, coordinate data collected from a particular component, or other information related to the layout of various components of a device display, graphical user interface, or electronic document. For example, when a user performs a press and drag event, the user input detector 102 can receive that user input information as a series of data points and events from the user input device, such as a mouse, trackpad, or touchscreen. The coordinate data 112 can store this information from the input device. In addition to data from the user input device, the user input detector 102 can also receive user input in the form of data points from a component of the electronic document. For example, where a user drags within a bounded area, the user input detector 102 can receive the user input as a series of coordinate points in relation to the bounded area. The coordinate data 112 can store this coordinate data from the bounded area component, or other components (such as the signature overlay). The coordinate data 112, can also include data related to the location of various components of the electronic document, such as the coordinates related to the location of the bounded area, the coordinates related to the size and location of the signature overlay, the coordinates of the graphical user interface, the coordinates of the electronic document, or the coordinates of the display screen.

Finally, the data storage manager 110 can also include user preference data 116. The user preference data 116 can include various user preferences for utilization by the electronic signature system 100. In particular, the user preference data 116 can include user preferences regarding visual characteristics of a signature overlay; visual characteristics of an original or adjusted signature; orientation or location of a signature; existence or content of any images presented in conjunction with a signature overlay; a preferred method for ending user input of a signature; characteristics of an adjusted signature; and any other user preferences particular to any given embodiment. For example, the user preference data 116 can include information indicating that a user prefers to have a signature oriented in a bounded area on the left edge of the bounded area with a 0.25" space along the left edge. Similarly, the user preference data 116 can include information indicating that the user prefers to end user input of a signature one-second after a mouse release and the user fails to provide any further user input. Moreover, user preference data 116 can include information indicating that the user prefers to see a rendering of a signature overlay as a dashed outline around the perimeter of the signature overlay.

Figure 2A:
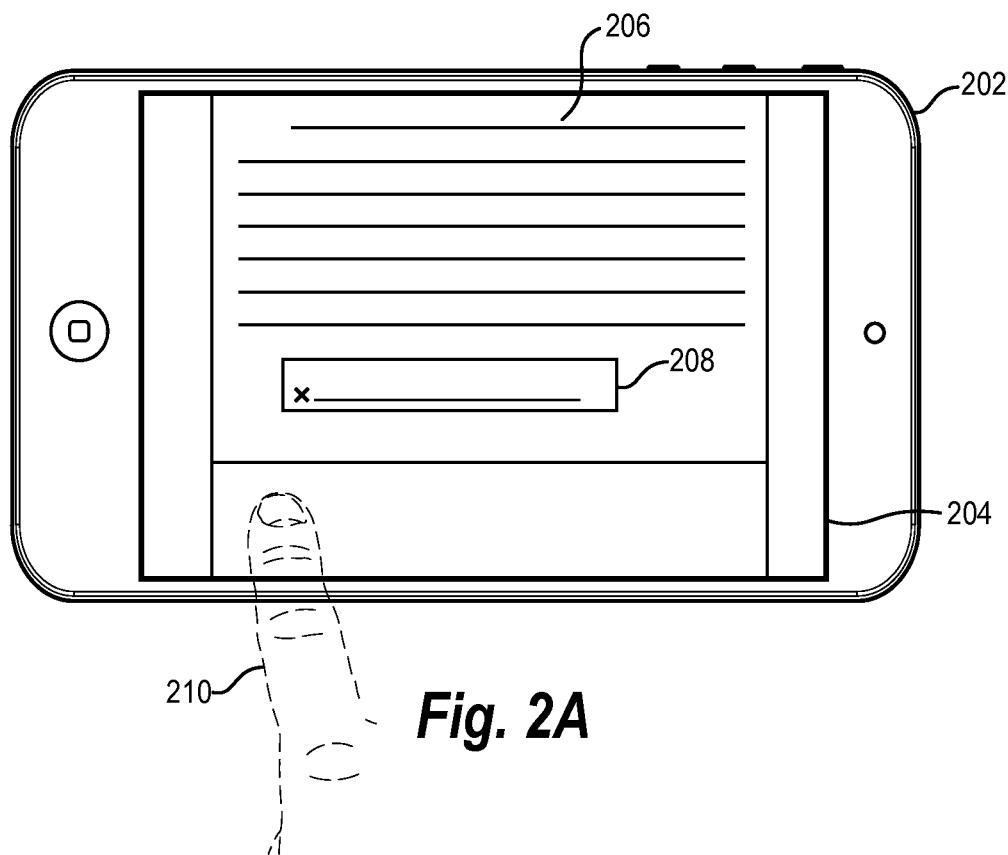
FIG. 2A illustrates a computing device displaying an electronic document that allows for input of an electronic signature in accordance with one or more embodiments.

As previously discussed, one or more embodiments of the electronic signature system 100 allow a user to enter a signature on an electronic document that is displayed on a computing device. FIG. 2A illustrates an example embodiment of a computing device 202 on which the electronic signature system 100, illustrated in FIG. 1, can be implemented. Although the embodiment shown in FIG. 2A is a tablet with a touchscreen receiving user input from a touch gesture from a user's finger 210, it will be recognized that the systems and methods disclosed can also be implemented on another type of device, including a personal computer, mobile device, smart phone, laptop, personal digital assistant, or other computer device, including one or more of the devices described below in conjunction with FIG. 8.

As further illustrated in FIG. 2A, the computing device 202 can include a display screen 204 showing an electronic document 206 with a bounded area 208 for receiving a user's electronic signature. For example, FIG. 2A illustrates a bounded area 208 having a size such that without the benefits provided by the electronic signature system 100, the size of the bounded area 208 would limit the available space for entry of an electronic signature, causing either lost data or a slowed, and modified, signature drawing.

Figure 2B:
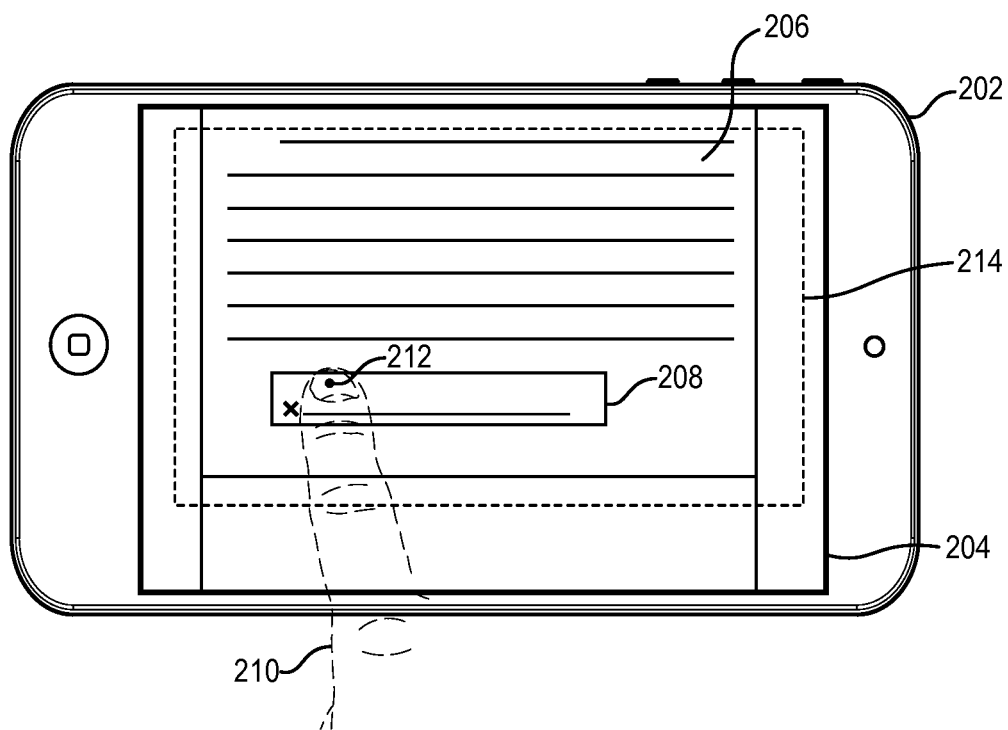
FIG. 2B illustrates the computing device of FIG. 2A and a representation of a signature overlay in accordance with one or more embodiments.

FIG. 2B illustrates the computing device 202 of FIG. 2A according to one or more embodiments. FIG. 2B shows a user moving their finger 210 into the bounded area 208 of the electronic document 206 and providing a touch gesture to the touchscreen at a location 212 within the bounded area. As explained above, in response to a user interaction with the bounded area 208, the electronic signature system 100 can generate a signature overlay. In particular, FIG. 2B shows that the electronic signature system 100 can generate an interface area (e.g., signature overlay 214) upon the user providing the touch gesture at the location 212 within the bounded area. FIG. 2B illustrates the signature overlay 214 as a dashed outline for explanation purposes, and as previously discussed, the electronic signature system 100 can provide a signature overlay having various visual characteristics As discussed above, upon the user providing the touch gesture with respect to location 212 within the bounded area 208 (or other user interaction indicating a desire to begin entering an electronic signature), one or more embodiments of the electronic signature system 100 begin to collect signature input (e.g., the point at location 212 is included as part of signature input). In one or more embodiments, the electronic signature system 100 can capture the initial user input with respect to the bounded area 208 because the signature overlay 214 was not present prior to receiving the initial touch gesture at location 212. In other embodiments, after the initial touch gesture at location 212, the electronic signature system 100 can capture any subsequent input event with respect to the signature overlay 214. Alternatively, the electronic signature system 100 can capture any subsequent input event with respect to the signature overlay 214 after an initial a release event.

Because the user can begin user input of an electronic signature by interacting with a component other than the signature overlay, one or more embodiments of the electronic signature system 100 can synchronize coordinate schemes among various components. For example, the electronic signature system 100 may detect the location 212 in terms of a Cartesian coordinate scheme associated with the bounded area 208. Specifically, the bounded area 208 coordinate scheme can describe the location 212 based on a horizontal and vertical distance from the origin of a Euclidean space associated with the bounded area 208. The location of an origin and the orientation of a coordinate scheme can vary depending on the particular embodiment. For example, an origin of a coordinate system may occur at the upper left hand corner of a bounded area, and positive distance from the origin may be measured as the distance to the right and below the origin. Similarly, components can utilize varying coordinate systems, including, a Cartesian coordinate system, a polar coordinate system, a spherical coordinate system, or other type of coordinate system.

By way of example, bounded area 208 can have a coordinate scheme having a defined origin with coordinates (0,0) located at the bottom left hand corner of the bounded area 208. Thus, the electronic signature system 100 can convey the location 212 as a certain distance to the right of, and above, the origin at the bottom left hand corner of the bounded area 208. For example, location 212 could be located at point (10, 12) of the bounded area 208 coordinate scheme, meaning 10 units to the right, and 12 units above, the origin.

Similar to the bounded area 208, the signature overlay 214 can be associated with a coordinate scheme corresponding to locations within the signature overlay 214. The signature overlay 214 coordinate scheme may differ from the coordinate scheme of the bounded area 208. For example, the origin of the coordinate scheme for the signature overlay 214 may occur at the bottom left hand corner of the signature overlay 214. Thus, although location 212 may be located at coordinate (10,12) within the bounded area 208 coordinate scheme, the same location 212 may be located at coordinate (50, 42), for example, within the signature overlay 214 coordinate scheme.

Figure 2C:
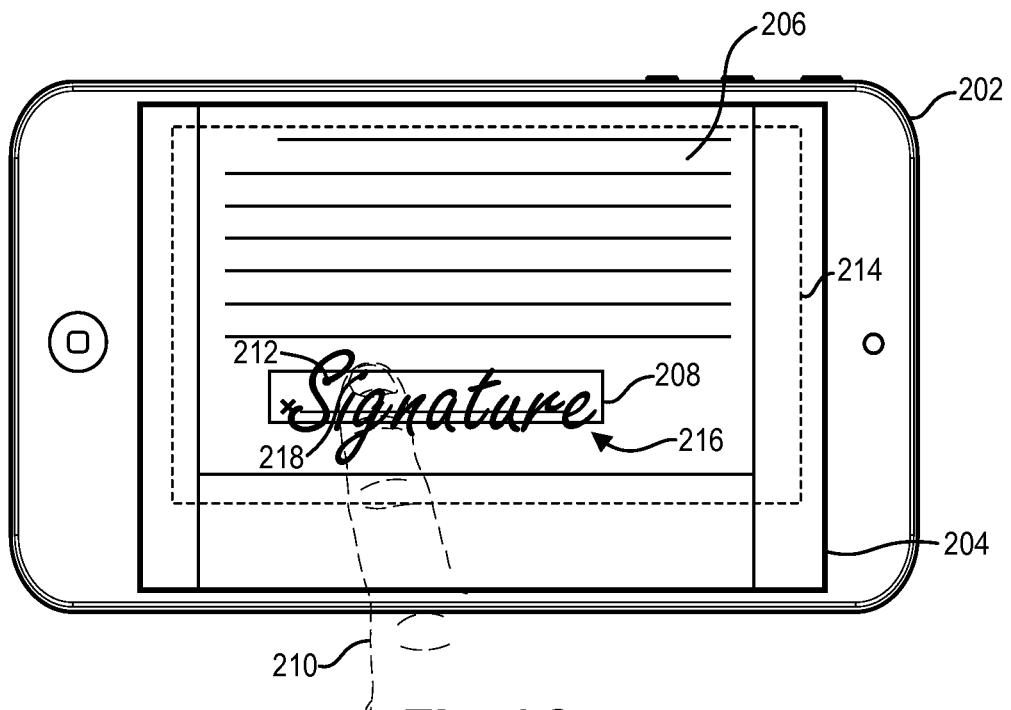
FIG. 2C illustrates the computing device of FIG. 2A and a representation of a user signature on a signature overlay in accordance with one or more embodiments.

Accordingly, and referring to FIG. 2C, one or more embodiments of the electronic signature system 100 receive signature input in terms of differing coordinate schemes associated with multiple components. As applied to this particular example, the electronic signature system 100 may receive the starting point at location 212 for the signature as coordinate (10,12) with respect to the bounded area 208 coordinate scheme, and a final location 218 for the signature as coordinate (58, 43) with respect to the signature overlay 214 coordinate scheme, with the plurality of intervening coordinates coming from a combination of the two component coordinate systems. For example, and as discussed above, any signature input received after the initial touch gesture at location 212, and prior to a first release event (e.g., lifting finger 210 from the touchscreen after inputting the "S"), can be received with respect to the bounded area 208 coordinate scheme. Furthermore, any signature input received after the first release event (e.g., the input of the letters "i" through "e" shown in FIG. 2C) can be received with respect to the signature overlay 214 coordinate scheme.

With reference again to FIG. 2C, as the user drags finger 210 across the display screen 204, the electronic signature system 100 can receive signature input representative of a signature. The user input can take the form of a series of points with respect to a coordinate scheme associated with a component. For example, as the user drags finger 212, the bounded area may provide the user input in the form of a series of coordinate points associated with the bounded area coordinate system. Specifically, as the user inputs an "S," shown in FIG. 2C, the user may drag finger 210 to the left and above the initial location 212. Thus, the bounded area 208 may provide the initial drag event in the form of a coordinate point (9, 13)—a point to the left and above the initial location 212, positioned at coordinate (10, 12) in relation to the origin of the bounded area 208 coordinate system. The bounded area 208 can continue to provide additional coordinate points associated with the bounded area as the user continues to drag finger 210 across the display screen 204 to input the signature.

As further illustrated in FIG. 2C, a user can input an original signature 216, using one or more of the methods described above, where the signature input for the original signature exceeds the one or more boundaries of bounded area 208, but does not exceed the boundaries of the signature overlay 214. As shown, for example, the user has input an original signature 216 largely corresponding to the bounded area 208, but has drawn parts of the original signature 216 outside the edges of the bounded area 208. Because of the signature overlay 214, however, the entire original signature 216 has been captured in accordance with the user input.

Specifically, as illustrated in FIG. 2C, a user has input an "S" that goes beyond the limits of the bounded area 208. In one or more embodiments, the electronic signature system 100 can receive user input of the "S" with reference to a coordinate scheme associated with the bounded area 208. Without the benefit of the electronic signature system 100, the user may have lost a portion of the signature input that exceeds the limits of the bounded area 208. The electronic signature system 100 can transfer signature input with reference to a bounded area coordinate scheme to a signature overlay so that a user will not lose any portion of signature input, even signature input that goes beyond the limits of the bounded area 208.

For example, upon a release event (e.g., after a user completes the "S" and lifts a finger from the touchscreen 204), the electronic signature system 100 can take user input received with regard to a coordinate scheme associated with the bounded area 208 and transfer the user input to a coordinate scheme associated with the signature overlay 214. In one or more embodiments, the electronic signature system 100 can then capture and/or record the entire original signature 212 using the signature overlay coordinate scheme. In other embodiments, the electronic signature system 100 can capture a first portion of the original signature 212 using a first coordinate scheme (e.g., a coordinate scheme related to a bounded area component), a second portion of the original signature 212 using a second coordinate scheme (e.g., a coordinate scheme related to a signature overlay), and a third portion of the original signature 212 using the first (or some other) coordinate scheme (e.g., the bounded area component, a second signature overlay, or some other component).

Moreover, as shown in FIG. 2C, in one or more embodiments the electronic signature system 100 allows a user to enter the original signature 216 based on multiple separate user interactions. For example, the location 218 is a dotted "i" and the drawn signature includes a crossed "t," indicating a set of user interactions in drawing the word "Signature" and then a separate set of user interactions to cross the "t" and dot the "i." Thus, one or more embodiments of the electronic signature system 100 allow a user to press a touchscreen, provide user input, release the touchscreen, re-press the touchscreen and provide additional user input, and so on until the user has completed the original signature 216.

Although a user can enter a signature through multiple user interactions with varying components over a period of time, at some point the user completes input of the original signature 216. As discussed above with reference to FIG. 1, the electronic signature system 100 can detect that the user has completed the signature, for example, by detecting a passage of a certain amount of time without receiving any additional user input (e.g., 2 seconds after the user dots the "i" at location 218).

Figure 2D:
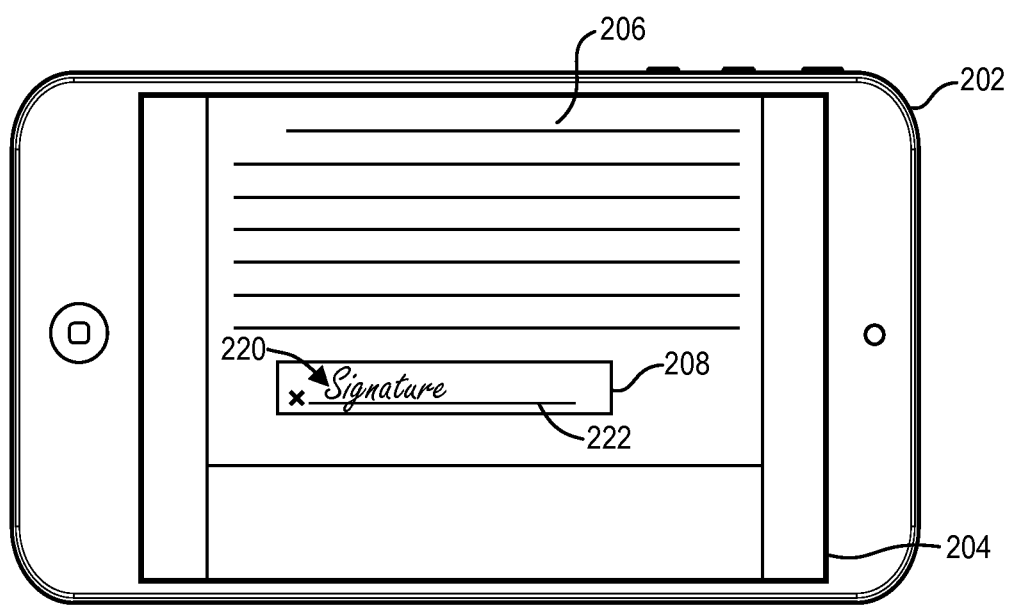
FIG. 2D illustrates the computing device of FIG. 2A displaying a rendering of an adjusted signature in accordance with one or more embodiments.

Upon conclusion of the user providing user input of the original signature 216, one or more embodiments of the electronic signature system 100 modify the original signature 216 to fit within the bounded area 208. FIG. 2D illustrates the computer device 202 from FIG. 2A and an adjusted signature 220 that has been modified to fit within the bounded area 208 of the electronic document 206 in accordance with one or more embodiments of the present disclosure. Moreover, as shown in FIG. 2D, one or more embodiments of the electronic signature system 100 can scale the original signature 216 to fit within the bounded area 208.

In addition to scaling the original signature 216 to create the adjusted signature 220, the electronic signature system 100 can also position the adjusted signature 220 so that it is oriented appropriately within the bounded area 208. For example, and as illustrated in FIG. 2D, the adjusted signature 220 is horizontally oriented on the left side of the bounded area 208 with a small empty space to the left of the adjusted signature 220. In addition, the adjusted signature 220 can be vertically oriented, as shown in FIG. 2D, so that the letters of the adjusted signature 220 (e.g., those without descenders) rest on a baseline 222 within the bounded area 208. The particular modifications, including orientation, location, style, color, thickness, and scaling, can vary depending on the particular embodiment, as discussed above.

In addition to modifying the original signature 216 to create the adjusted signature 220 to fit within the bounded area 208, the electronic signature system 100 can also remove the signature overlay 214. For example, and as illustrated in FIG. 2D, upon a user completing the process of providing signature input the electronic signature system 100 can remove the signature overlay 214. By removing the signature overlay 214, the electronic signature system 100 permits the user to interact with components that were previously covered by the signature overlay 214. As discussed previously, the electronic signature system 100 can remove the signature based on a variety of factors.

Figure 3A:
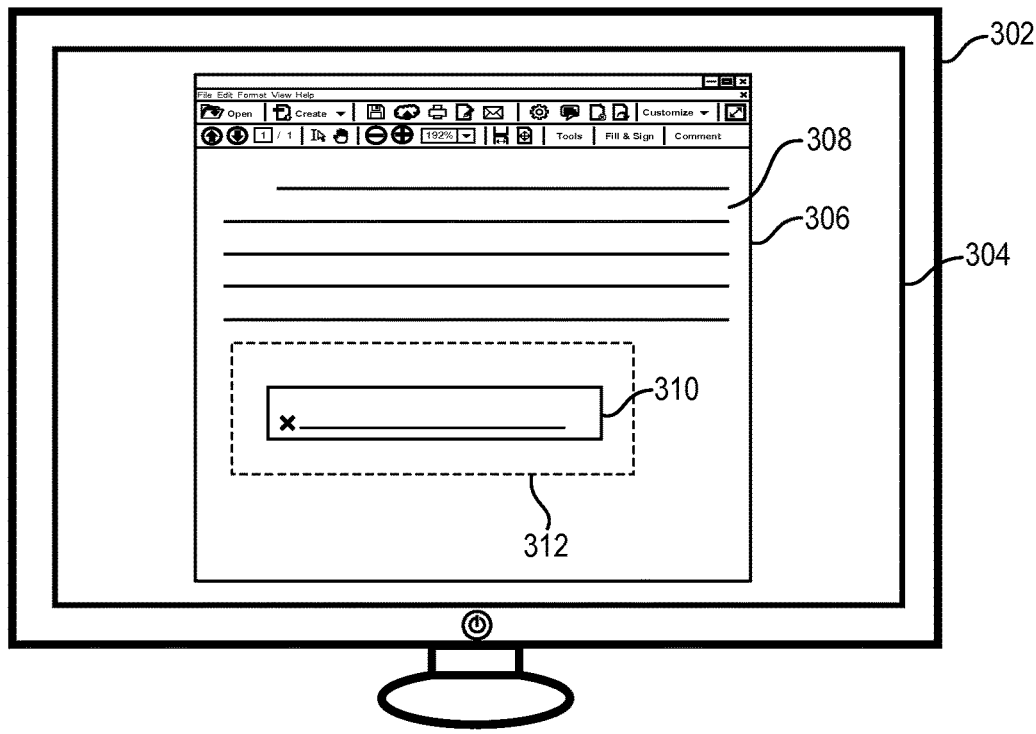
FIG. 3A illustrates a computing device displaying an electronic document and a representation of an example signature overlay in accordance with one or more embodiments.
Figure 3B:
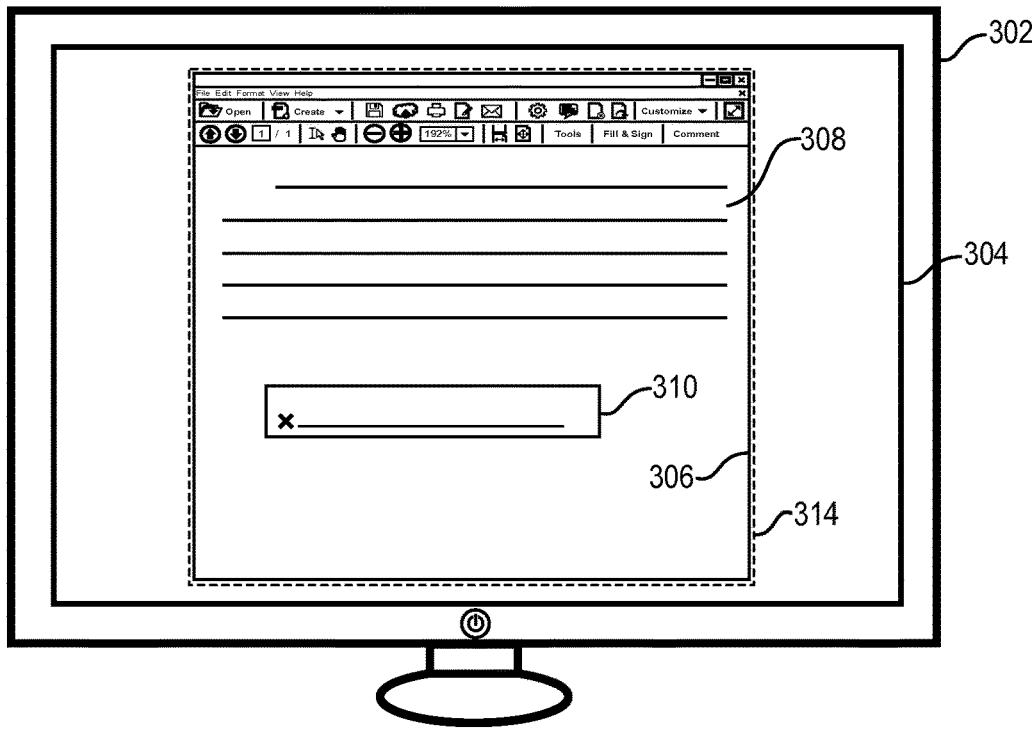
FIG. 3B illustrates a computing device displaying an electronic document and a representation of another example signature overlay in accordance with one or more embodiments.
Figure 3C:
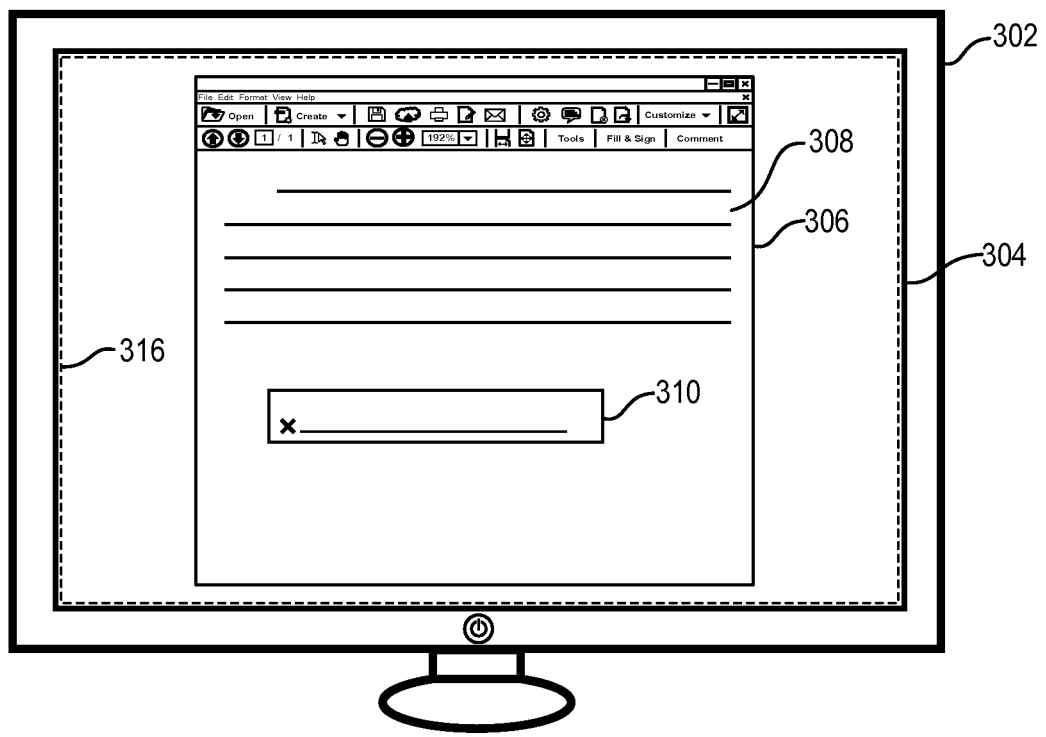
FIG. 3C illustrates a computing device displaying an electronic document and a representation of another example signature overlay in accordance with one or more embodiments.

As mentioned above with reference to FIG. 1, one or more embodiments of the electronic signature system 100 can provide a signature overlay of various geometric sizes in various positions or locations. FIGS. 3A-3C illustrate various examples of geometric sizes and various position or locations of a signature overlay. For example, FIGS. 3A-3C illustrate a computing device 302 with a display screen 304 showing a graphical user interface 306 associated with an electronic document 308 containing a bounded area 310.

In one or more embodiments, and as illustrated in FIG. 3A, the electronic signature system 100 can position an interface area (e.g., signature overlay 312) to encompass the bounded area 310 while leaving areas of the graphical user interface 306 exposed (e.g., not covered by the signature overlay 312). This could be necessary, for instance, in an embodiment where the user may need to interact with other components within the graphical user interface 306 even after presentation of the signature overlay 312. For example, in an embodiment running on a web-browser within a graphical user interface 306, the electronic signature system 100 may place the enlarged signature overlay 312 so as to cover the bounded area but not so large so as to cover the navigation buttons within the web browser so that the user can navigate away from the web-page at any time if necessary.

Alternatively, FIG. 3B illustrates an example in which an interface area (e.g., signature overlay 314) encompasses the entire area of the graphical user interface 306. This approach can capture any user input that falls within the graphical user interface 306, but leave areas within the display screen 304 and outside the graphical user interface 306 exposed (e.g., not covered by the signature overlay 314). This can permit a user to utilize the entire graphical user interface 306 for entry of a signature, while still allowing the user to interact with applications, dialogue boxes, or other systems outside the graphical user interface 306 while the signature overlay 314 is active.

Moreover, FIG. 3C illustrates another example embodiment in which an interface area (e.g., signature overlay 316) is larger than the graphical user interface 306 and encompasses the entire area of the display screen 304. This approach captures any user input falling within the entire display screen 304, and maximizes the area available for detecting and recording signature input. Although FIGS. 3A, 3B, and 3C show three alternative embodiments with three alternative signature overlay sizes and locations, the electronic signature system 100 can generate the signature overlay in other sizes and positions as discussed in detail above.

Figure 4A:
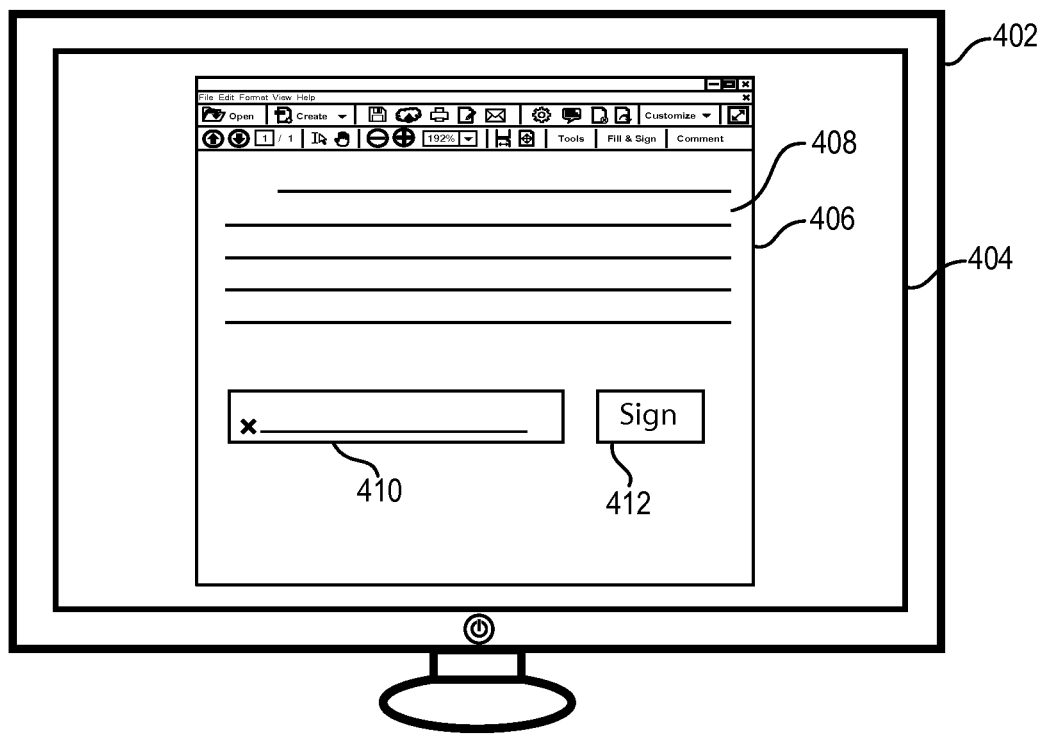
FIG. 4A illustrates an example computing device displaying an electronic document that allows for input of an electronic signature in accordance with one or more embodiments.

To further assist a user in entering an electronic signature, one or more embodiments of the electronic signature system 100 operate in conjunction with programs, applications, or systems that provide an enlarged area, such as a dialogue box, for entry of an electronic signature. For example, FIG. 4A illustrates a computing device 402, with a display screen 404, showing a graphical user interface 406, with an electronic document 408, containing a bounded area for a signature 410. The electronic document also contains a selectable component 412 for providing the user with an enlarged dialogue box for signature entry. For instance, upon the user selecting the component 412, the graphical user interface 406 can provide an enlarged dialogue box with additional space for entering an electronic signature.

Figure 4B:
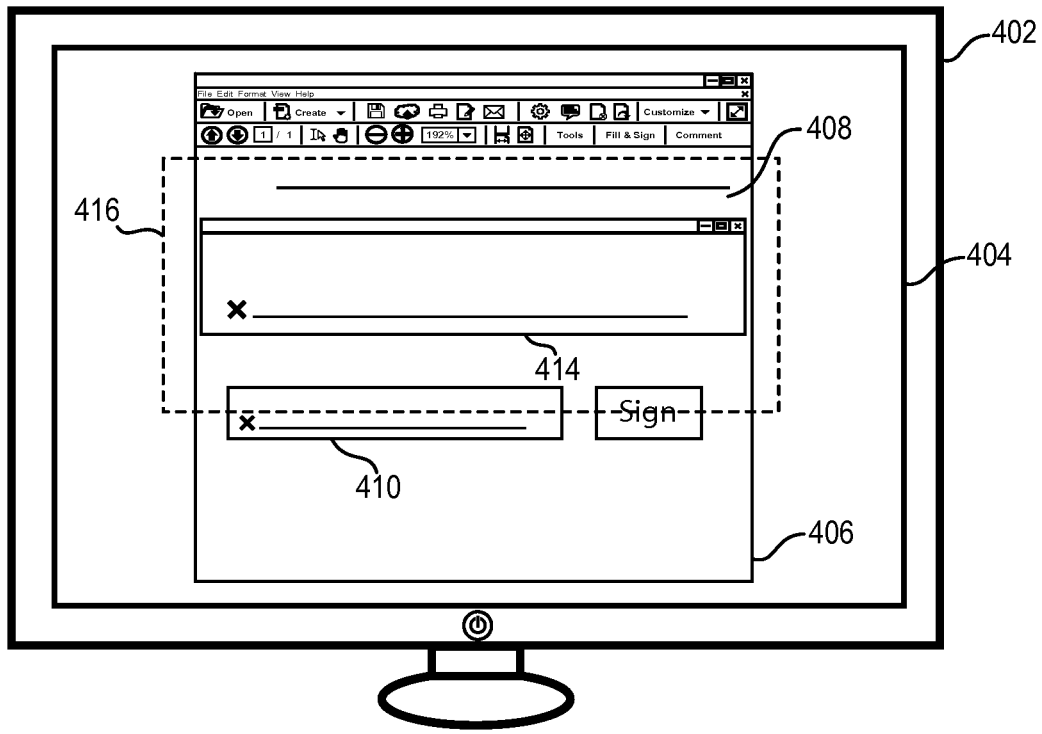
FIG. 4B illustrates the computing device of FIG. 4A displaying a separate dialogue box for signature input and a representation of a signature overlay in accordance with one or more embodiments.

In particular, FIG. 4B illustrates the computing device 402 from FIG. 4A with a graphical user interface 406 showing an enlarged dialogue box 414 with additional space for entering an electronic signature. Although the enlarged dialogue box 414 may provide additional space for user input of a signature, the separate dialogue box 414 can still clip the edge of a signature when signature input is provided outside of the enlarged dialogue box 414. This may be particularly problematic when the graphical user interface 406 is small, and the dialogue box 410 is constrained by the size of the graphical user interface 406 (e.g., on a smart phone).

As illustrated in FIG. 4B, one or more embodiments of the electronic signature system 100 provide a signature overlay encompassing the enlarged dialogue box 414. Thus, even if the user exceeds the boundaries of the enlarged dialogue box 414, the electronic signature system 100 can capture the entirety of the signature input. Indeed, regardless of the size of the graphical user interface, an enlarged area beyond the dialogue box 414 area can provide a safeguard against unnecessary clipping, user frustration with the size of the dialogue box 414, or user inability to stay within the dialogue box 414 when providing signature input at a normal pace.

Although FIGS. 4A and 4B illustrate a component 412 in the form of a button and an enlarged area for signature entry in the form of a dialogue box 414, the particular nature of the components can vary from embodiment to embodiment. Regardless of the form of a particular bounded area, the electronic signature system 100 can assist in receiving a signature by utilizing a signature overlay as described.

As discussed above, the electronic signature system 100 can modify an original signature to fit within a bounded area. In one or more embodiments, the electronic signature system 100 can retrieve a series of points in a first coordinate system making up an original signature, convert the series of points to a second coordinate system, scale the series of points based on the second coordinate system to produce a scaled signature, determine the location of the scaled signature, and relocate the scaled signature. In particular, in one or more embodiments, the electronic signature system can obtain an original signature in terms of a series of data points in a signature overlay coordinate system, convert the series of data points to a bounded area coordinate system, scale the series of points based on the bounded area coordinate system so that the signature will be sized to fit within the bounded area, and relocate the scaled signature to fit within the bounded area. As mentioned above, the electronic signature system 100 can modify an original signature in a variety of other ways (e.g., with additional or fewer steps) or in a variety of other orders (e.g., locating before scaling), as may be desired for a particular embodiment.

Figure 5A:
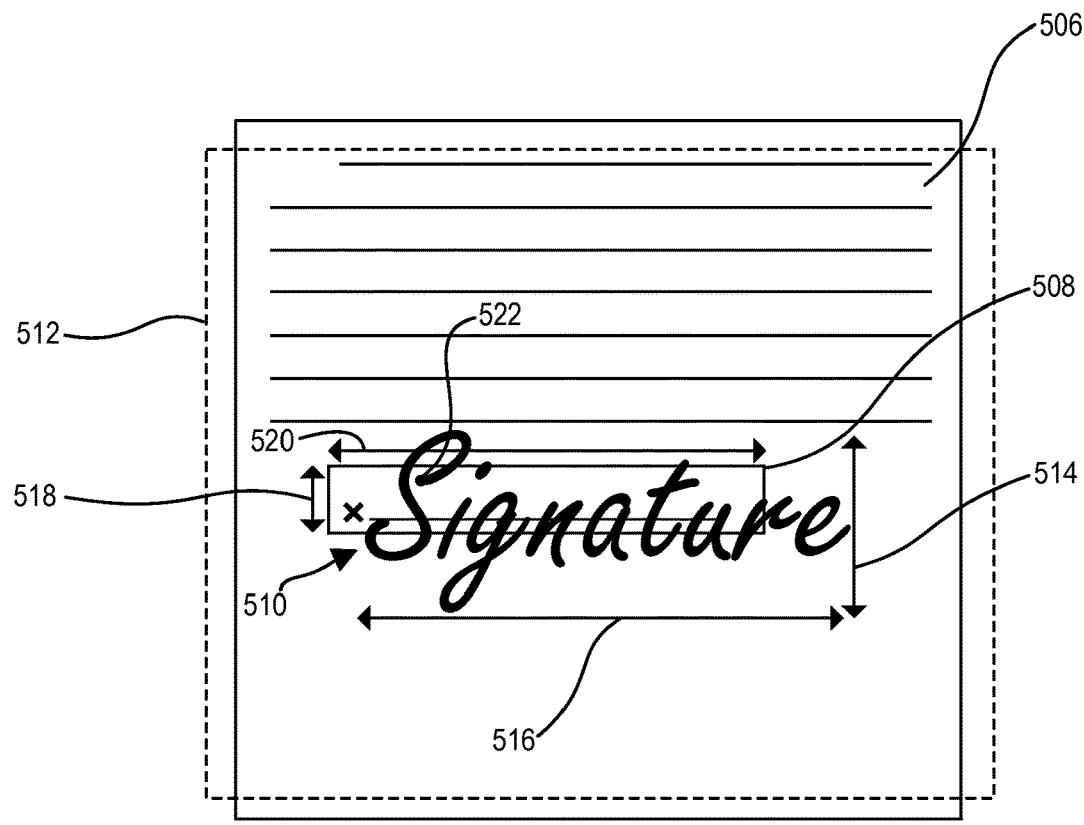
FIG. 5A illustrates a representation of an electronic document and an original signature entered on a signature overlay in accordance with one or more embodiments.
Figure 5B:
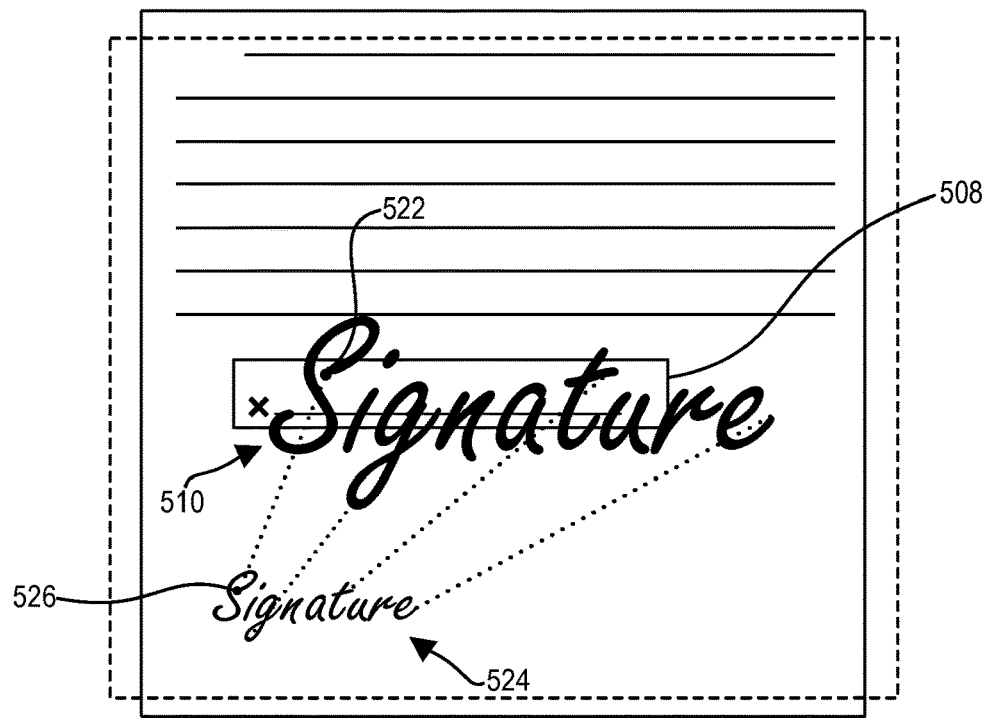
FIG. 5B illustrates the electronic document of FIG. 5A and modification of the original signature in accordance with one or more embodiments.
Figure 5C:
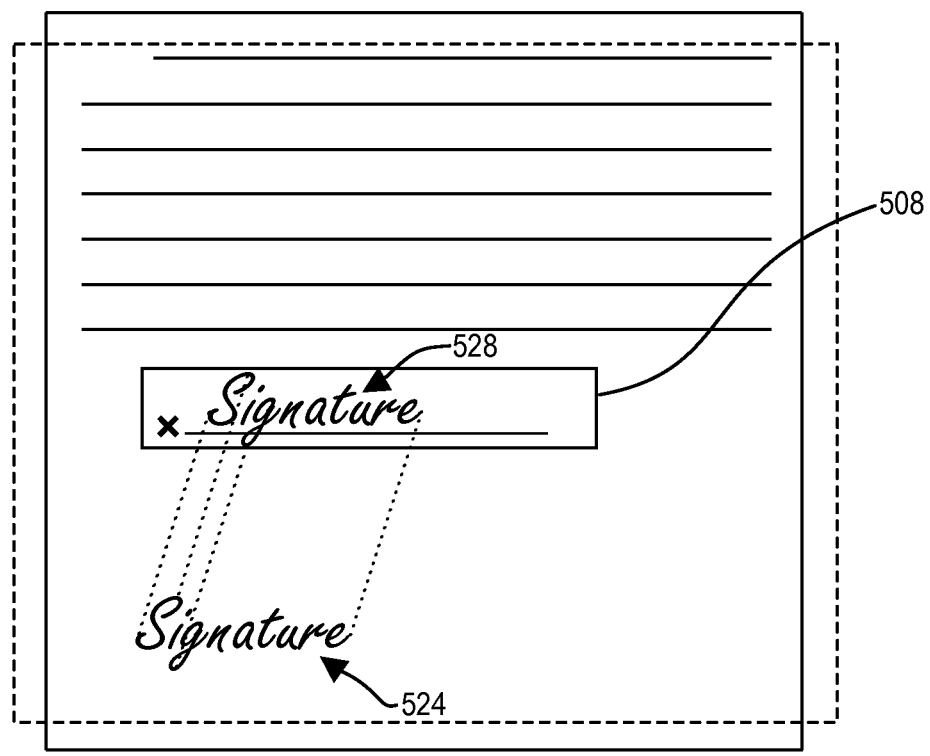
FIG. 5C illustrates the electronic document of FIG. 5A and additional modification of the original signature in accordance with one or more embodiments.

Referring now to FIGS. 5A-5C, additional detail will be provided with respect to the process of modifying an original signature to create an adjusted signature to fit within a bounded area. In particular, FIGS. 5A-5C each describe example modifications that the electronic signature system 100 can use to modify an original signature to create an adjusted signature. As mentioned above, it will be appreciated that the electronic signature system 100 can provide a variety of modifications in any order.

For example, FIG. 5A illustrates an electronic document 506 with a bounded area 508 for displaying an electronic signature. As shown, a user can provide an original signature 510 that exceeds the size of the bounded area 508 by utilizing an interface area (e.g., signature overlay 512). The original signature has dimensions, including a signature height 514 (e.g., representing a maximum signature height) and a signature width 516 (e.g., representing a maximum signature width). In addition, the bounded area has dimensions, including a bounded area height 518 and a bounded area width 520. In the particular embodiment shown in FIG. 5A the original signature consists of a series of data points, including a first data point 522.

In one or more embodiments, the electronic signature system 100 can detect the signature height 514 and signature width 516 and detect the bounded area height 518 and bounded area width 520. Furthermore, the electronic signature system 100 can divide the bounded area height 518 by the signature height 514 to determine a height ratio between the original signature 510 and the bounded area 508. Similarly, the electronic signature system 100 can divide the bounded area width 520 by the signature width 516 to determine a width ratio between the original signature 510 and the bounded area 508. In one or more embodiments, the electronic signature system 100 can identify the smaller of the height ratio and the width ratio as a controlling ratio, i.e., the ratio for the dimension of the original signature 210 that needs the greatest amount of scaling to fit within the bounded area 508.

For example, consider a scenario where the signature height 514 is 50 units, the signature width 516 is 100 units, the bounded area height 518 is 25 units and the bounded area width 520 is 75 units. The electronic signature system 100 can detect these dimensions and calculate the height ratio as 0.5 (i.e., 25 divided by 50) and calculate the width ratio as 0.75 (i.e., 75 divided by 100). Accordingly, the electronic signature system 100 can determine that the height ratio, 0.5, is the controlling ratio.

To produce a signature that will fit within the bounded area 508, one or more embodiments of the electronic signature system 100 retrieve the coordinates of all points making up the original signature 510 and apply the controlling ratio to those coordinates to scale the original signature 510. As discussed above, depending on the embodiment, the electronic signature system 100 can determine signature coordinates based on one or more components. For example, the coordinates of the signature could relate to coordinates of the bounded area, coordinates of the signature overlay, or some other component, such as a graphical user interface.

FIG. 5B shows the electronic document 506 of FIG. 5A and the modification of an original signature in accordance with one or more embodiments. As shown in FIG. 5B the electronic signature system 100 can apply the controlling ratio to the coordinates of the original signature 510 to scale the original signature and produce an adjusted signature 524. For example, consider a scenario where the original signature 510 consists of a series of coordinate points, including the first data point 522 having a coordinate (60, 40) on the signature overlay coordinate system. One or more embodiments of the electronic signature system 100 accesses these coordinates and applies the controlling ratio to scale the original signature 510 to a size that can fit within the bounded area 508.

For example, assuming a controlling ratio of 0.5, the electronic signature system 100 can scale the first data point 522 at coordinate (60, 40) and generate adjusted data point 526 at coordinate (30, 20) with respect to the signature overlay 512 coordinate scheme. The electronic signature system 100 can apply the controlling ratio in a similar manner to all data points within the original signature 510 to produce an adjusted signature 524 with a size that will fit within the bounded area 508.

In addition, as discussed above, in one or more embodiments the electronic signature system 100 can convert from one coordinate scheme to another coordinate scheme when modifying an original signature. As discussed, this conversion can take place at any point in modifying an original signature. For instance, in the example just provided, before modifying the original signature 510, the electronic signature system 100 can convert the coordinates of the original signature 510 from the signature overlay 512 coordinate scheme to the bounded area 508 coordinate scheme. As applied to the first data point 522, the electronic signature system 100 can convert the first data point 522 from the coordinate (60, 40) with respect to the signature overlay 512 coordinate scheme to coordinate (20, 10) with respect to the bounded area 508 coordinate scheme. Thereafter, in one or more embodiments the electronic signature system 100 can calculate a controlling ratio (assuming, e.g., 0.5 from previous example) and apply the controlling ratio to the coordinates of the original signature 510 (e.g., changing point 522 from coordinate (20, 10) to coordinate (10, 5) with respect to the bounded area 508 coordinate scheme).

It will be appreciated that although this disclosure provides examples of scaling a signature in one or more embodiments, the examples are not limiting, and the electronic signature system 100 can utilize other scaling methods depending on a particular embodiment. For example, the electronic signature system 100 can scale one or more dimensions of the original signature independently of other dimensions, can calculate ratios in a variety of methods, or can utilize other dimensions (beside height and width). Similarly, the electronic signature system 100 can scale a signature based on some other dimension or characteristic. For example, the electronic signature system 100 can scale the signature to include a buffer area between the signature and the bounded area. Moreover, although FIG. 5 illustrates proportionate scaling, in other embodiments the electronic signature system 100 may scale the original signature disproportionately or according to user preference. In addition, other embodiments of the electronic signature system 100 can utilize an entirely different scaling method; for example, converting the signature to an image and adjusting the dimensions of the image.

FIG. 5C shows the electronic document of FIG. 5A and additional modification of a signature in accordance with one or more embodiments. As illustrated in FIG. 5C, in addition to scaling, one or more embodiments of the electronic signature system 100 can move the adjusted signature 526 to generate a further adjusted signature 528 that it is located within the bounded area 508. To this end, one or more embodiments of the electronic signature system 100 detect the range of coordinates making up the adjusted signature 526 and generate a further adjusted signature 528 by relocating those coordinates to the desired orientation within the bounded area 508. For example, the electronic signature system 100 can detect the left-most coordinate of the adjusted signature 526 and move that coordinate so that it is located on the left side of the bounded area 508. Alternatively, the electronic signature system 100 can detect the minimum coordinates and maximum coordinates of the adjusted signature 526, average the maximum and minimum coordinates, calculate a middle coordinate, and move the adjusted signature 526 so as to create the further adjusted signature 528 centered within the bounded area 508. Similarly, as illustrated, the electronic signature system 100 can detect the right-most coordinate, the left-most coordinate, the upper-most coordinate, and/or the lower-most coordinate of the adjusted signature 524 and locate the adjusted signature 524 by comparing those coordinates to the coordinates of the bounded area 508. In other embodiments, the electronic signature system 100 can utilize other coordinates to locate the further adjusted signature 528 to a desired position of the bounded area. In yet other embodiments, the electronic signature system 100 can utilize other relocation techniques, such as converting the signature to an object or component, and relocating based on the position of the object or component.

Although FIGS. 5A-5C illustrate scaling the original signature 510 before moving the adjusted signature 524, the electronic signature system 100 utilized in other embodiments can move the original signature before scaling. Additionally, other embodiments of the electronic signature system 100 can both scale and move the original signature at the same time. Moreover, the electronic signature system 100 can resize and relocate the original signature in a different order or sequence than discussed above. In addition to scaling and moving, other embodiments can modify the original signature 510 in other ways. For example, the electronic signature system 100 can also rotate a signature as necessary to better fit within a bounded area, or in accordance with user preference.

Figure 6:
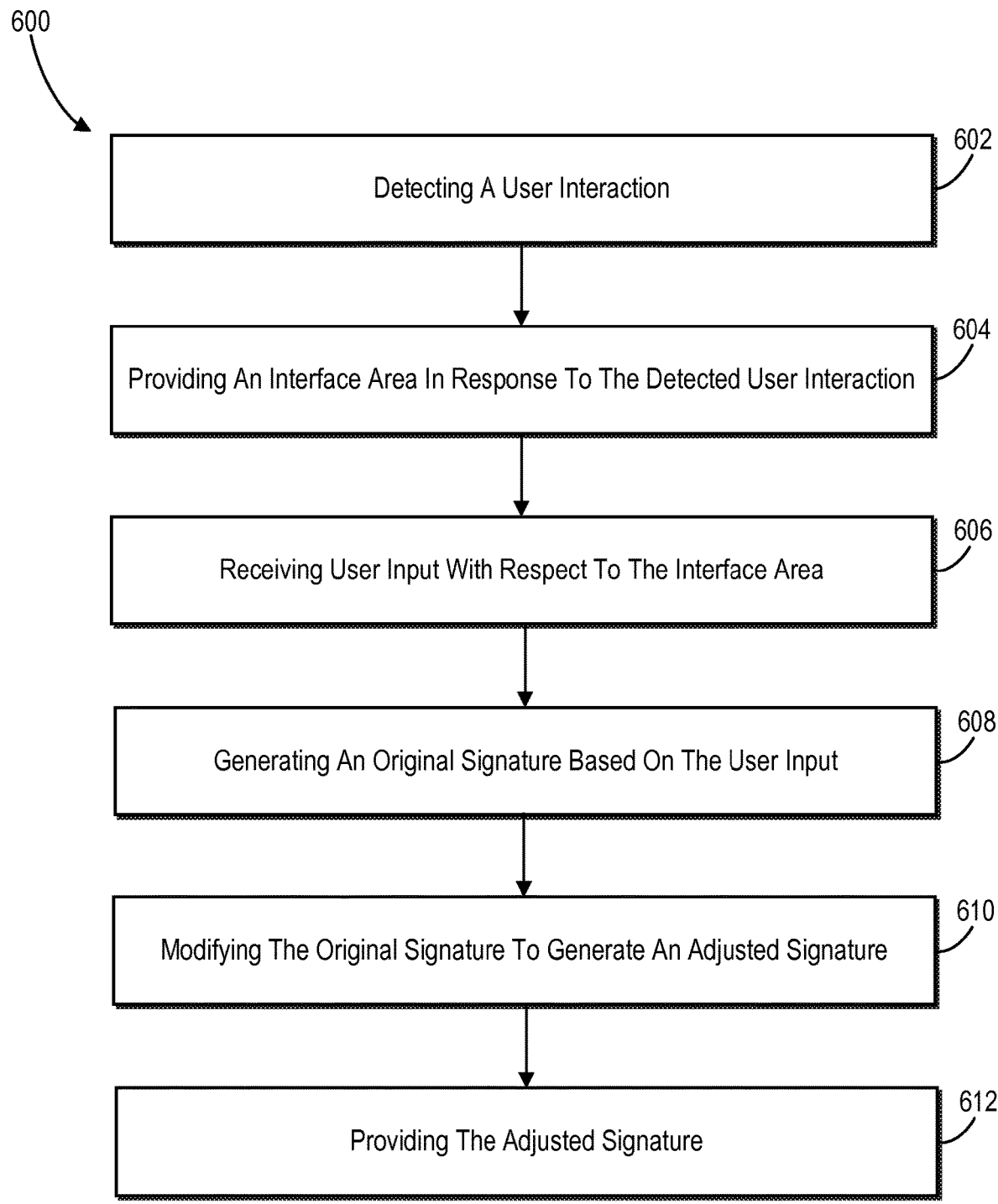
FIG. 6 illustrates a flowchart of a series of acts in a method of capturing an electronic signature utilizing a signature overlay in accordance with one or more embodiments.
Figure 7:
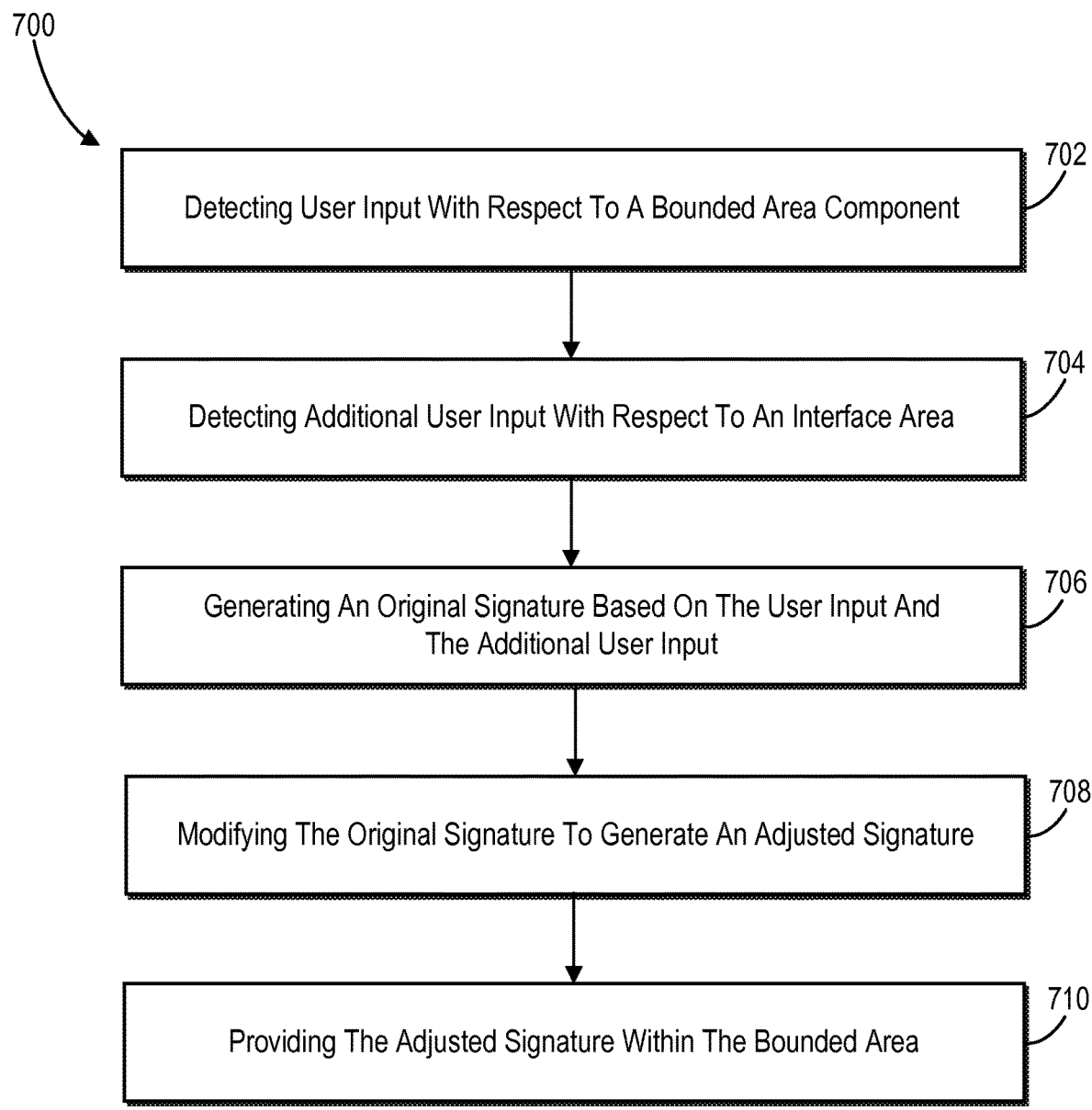
FIG. 7 illustrates a flowchart of a series of acts in a method of capturing an electronic signature utilizing a signature overlay in accordance with one or more embodiments.

FIGS. 1-5C, the corresponding text, and the examples, provide a number of different systems and devices that allows a user to provide an electronic signature in a bounded area. In addition to the foregoing, embodiments can also be described in terms of flowcharts comprising acts and steps in a method for accomplishing a particular result. For example, FIGS. 6 and 7 illustrate flowcharts of exemplary methods in accordance with one or more embodiments of the present invention. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method 600 of receiving an electronic signature utilizing an interface area in accordance with one or more embodiments of the present invention. In one or more embodiments, the method 600 is performed in a digital medium environment that includes an electronic signature system 100. The electronic signature system 100 may provide a system that allows a user to input a signature into an electronic document. The method 600 is intended to be illustrative of one or more methods in accordance with the present disclosure, and is not intended to limit potential embodiments. Alternative embodiments can include additional, fewer, or different steps than those articulated in FIG. 6.

The method 600 includes an act 602 of detecting a user interaction. For example, the act 602 can include detecting a user interaction that indicates a user's intent to provide an electronic signature in abounded area. For instance, the act 602 can include detecting a finger touching a location on a touchscreen corresponding to the location of a bounded area within an electronic document. In other example embodiments, the method 600 can include detecting a user interaction 602 with respect to another component, such as a button, a menu, or other graphical element.

In addition, the method 600 includes the act 604 of providing an interface area in response to the detected user interaction. For example, the act 604 can include providing, in response to detecting the user interaction, an interface area that is larger than a bounded area and positioned so that the interface area encompasses a bounded area. Act 604 can include providing a signature overlay with a variety of different characteristics. In some embodiments, for example, the act 604 can provide a signature overlay by rendering a signature overlay within a graphical user interface to be visually detectable to a user. Other embodiments include providing a signature overlay by generating a signature overlay within a graphical user interface to be visually undetectable to a user. As discussed, in other embodiments, act 604 can include providing a signature overlay with different colors, shapes, images, texts, borders, effects, textures, or advertisements.

In addition, act 604 can include providing a signature overlay of various sizes. For example, act 604 can include providing a signature overlay so that it is larger than a bounded area in an electronic document. One or more embodiments, act 604 can include determining a coverage area of a signature overlay to match a size and a position of a graphical user interface, wherein an electronic document is presented within a graphical user interface. Other embodiments act 604 can include determining a coverage area of a signature overlay to cover an area larger than a graphical user interface area, wherein an electronic document is presented within a graphical user interface.

The method 600 also includes the act 606 of receiving user input with respect to the interface area. For example, the act 606 can include receiving user input representative of a user's signature. For instance, act 606 can include receiving user input captured by the signature overlay manager 104 as provided through a variety of input devices. In some embodiments of the method 600, at least a portion of user input is provided outside of a bounded area in an electronic document. For example, act 606 can include detecting user input provided outside of a bounded area but within the area covered by a signature overlay. In other embodiments, the act 606 can consist of receiving user input both within and outside of the bounded area, wherein the user input is representative of the user's signature.

In one or more embodiments, method 600 can include detecting user input with respect to a variety of components, including a signature overlay component and/or a bounded area component. In one or more embodiments, method 600 can include detecting user input based on a user interaction with a bounded area indicating that the user seeks to input a signature, and the same user interaction can begin user input of the signature.

In addition, the act 606 of receiving user input with respect to the interface area can include receiving one or more separate user input events, including user input events based on one or more user interactions with a mouse, trackpad, or touchscreen. For example, act 606 can include receiving one or more separate user input events that collectively represent user input of an original signature. In particular, act 606 can include receiving a press event, movement event, and release event constituting one portion of an original signature and receive a separate press event, a separate movement event, and a separate release event constituting another portion of an original signature.

The method 600 can also include detecting an indication that the original signature is complete. Detecting an indication that the original signature is complete can include determining an expiration of a time period within which no user input related to providing an electronic signature is received. For example, the method can include detecting a user interaction that indicates the user has finished entry of an electronic signature, including selection of a component, or passage of a designated period of time without user input.

In addition, the method 600 can include the act 608 of generating an original signature based on the user input. For example, the act 608 can include generating an image of the original signature to present to the user, wherein a portion of the image of the original signature exceeds the bounded area. Act 608, for example, can include rendering a signature image as the user provides user input of an electronic signature. Similarly, act 608 can include rendering a signature based on user input from one or more components.

The method 600 also includes an act 610 of modifying the original signature to generate an adjusted signature. For example, the act 610 can include modifying the original signature to generate an adjusted signature that will fit within a bounded area of an electronic document. Act 610, for example, can include modifying the original signature in a variety of ways, including scaling, relocating, and rotating the original signature.

As mentioned above, the method 600 also includes an act 612 of providing the adjusted signature. The act 612 can include, for example, providing the adjusted signature within a bounded area. For instance act 612 can include positioning an adjusted signature within a specified area of a bounded area of an electronic document. In addition, providing the adjusted signature can include communicating a data file that includes the adjusted signature to one or more computing devices or storage devices.

FIG. 7 illustrates a flowchart of a series of acts in a method 700 of receiving a signature utilizing an interface area in accordance with one or more embodiments of the present invention. The method 700 includes an act 702 of detecting user input with respect to a bounded area component. For example, the act 702 includes receiving user input with respect to a bounded area component located within an electronic document, wherein the user input is representative of a first portion of a user's signature. In particular, act 702 can include receiving user input reflecting a first portion of a signature as entered with regard to a bounded area component, or some other component.

In addition, the method 700 includes an act 704 of detecting additional user input with respect to an interface area. For example, the act 704 includes receiving additional user input provided with respect to an interface area, wherein the additional user input is representative of a second portion of the user's signature. In particular, act 704 can include receiving user input from the signature overlay manager 104 reflecting a second portion of a signature as entered with regard to the signature overlay component after receiving a first portion of the signature with regard to the bounded area component.

The act 704 can also include determining a coverage area of the signature overlay to cover an area larger than a graphical user interface, wherein the electronic document is presented within the graphical user interface. In other embodiments, the act 704 can include determining a coverage area of a signature overlay to match a size and a position of a graphical user interface, wherein an electronic document is presented within a graphical user interface. The act 704 can also include detecting an indication that the original signature is complete, for example, where the indication that the original signature is complete is a lack of user input of an original signature for a period of time.

In addition, the method 700 includes an act 706 of generating an original signature based on the user input and the additional user input. For example, the act 706 can include providing, to the user, a visual representation of the generated original signature, wherein a portion of the visual representation exceeds the bounded area. As mentioned above, can include creating an original signature and a rendering of an original signature based on user input from the user input detector 102, where the user input detector 102 received the user input from multiple components, including a bounded area and signature overlay.

The method 700 also includes an act 708 of modifying the original signature to generate an adjusted signature 708. The act 708 can include the step of determining one or more required characteristics for a final signature. Required characteristics can include any of the modifications described above with regard to modifying an original signature. For example, act 708 can include modifying the original signature and generating an adjusted signature so as to fit within a bounded area.

The method 700 also includes an act 710 of providing the adjusted signature within the bounded area. The act 710 can also include, for example, providing an adjusted signature within a bounded area located within an electronic document. For example, as discussed previously, act 710 can include the signature generator 106 receiving or retrieving an adjusted signature and providing the adjusted signature within a bounded area of an electronic document. In addition, act 710 can include communicating a data file that includes the adjusted signature to one or more computing devices or storage devices.

The methods 600 and 700 are exemplary of embodiments of a method for receiving signatures using a signature overlay in accordance with the present disclosure. The methods 600 and 700 are not meant to exclude or limit alternative methods of implementing the disclosures herein. In addition, the individual parts of methods 600 and 700 can be performed in isolation or combination. Furthermore, although FIGS. 6 and 7 present the parts of methods 600 and 700 in a particular order does not imply that any particular embodiment must perform the parts in a particular sequence or order. For example, as discussed, the user interaction indicating a user seeks to enter a signature in a bounded area can also begin user input of an original signature.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
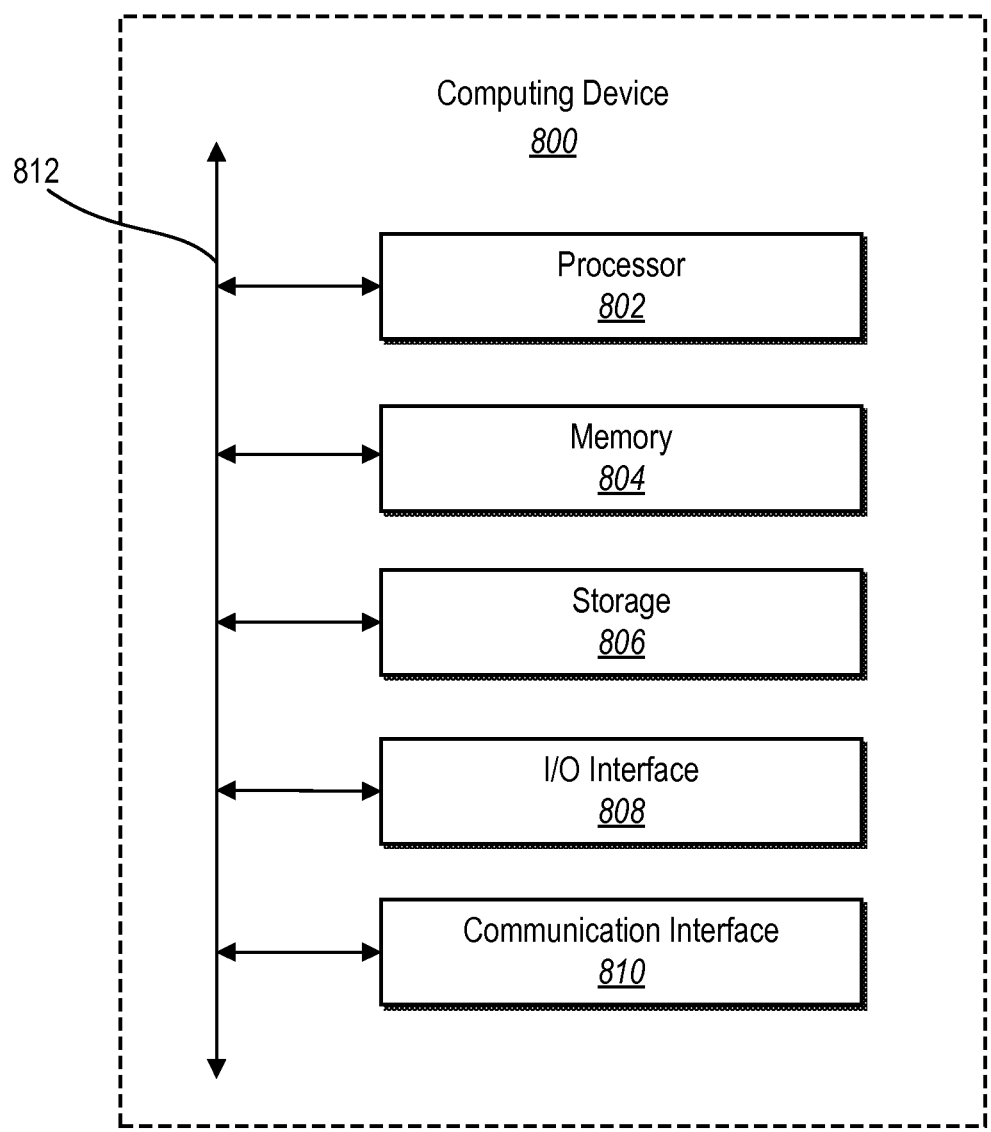
FIG. 8 illustrates a block diagram of an exemplary computing device in accordance with one or more embodiments.

FIG. 8 illustrates a block diagram of an exemplary computing device 800 that may be configured to perform one or more of the processes described above. One will appreciate that one or more computing devices, such as the computing device 800, may implement the electronic signature system 100. As shown by FIG. 8, the computing device 800 can comprise a processor 802, memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In particular embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In particular embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, the storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In particular embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH™ WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. In a digital medium environment, a method of capturing signatures to include within a digital document, comprising:
    providing an electronic document for display via a user interface of a computing device, the user interface comprising a bounded area component of the electronic document;
    in response to identifying a user interaction with the bounded area component, collecting user input of a first portion of an electronic signature via the bounded area component in a first coordinate scheme having a first origin point defined relative to the bounded area component;
    generating a digital overlay having a first size exceeding a size of the bounded area component;
    receiving, by at least one processor, user input of a second portion of the electronic signature via the digital overlay in a second coordinate scheme having a second origin point defined relative to the digital overlay;
    transferring at least one of the first portion of the electronic signature or the second portion of the electronic signature to a common coordinate scheme to generate, by the at least one processor, an original signature in the common coordinate scheme based on the first portion of the electronic signature and the second portion of the electronic signature;
    modifying, by the at least one processor, the original signature to generate an adjusted signature; and
    providing the adjusted signature for display within the bounded area component via the computing device.

2. The method of claim 1, wherein transferring at least one of the first portion of the electronic signature or the second portion of the electronic signature to the common coordinate scheme comprises transferring the first portion of the electronic signature to the second coordinate scheme having the second origin point defined relative to the digital overlay.

3. The method of claim 1, wherein the common coordinate scheme comprises at least one of: the first coordinate scheme having the first origin point defined relative to the bounded area component or the second coordinate scheme having the second origin point defined relative to the digital overlay.

4. The method of claim 1, wherein generating the digital overlay having the first size comprises selecting the first size based on a user age and further comprising selecting the first size based on the user age.

5. The method of claim 1, further comprising selecting the first size based on a determination that the computing device is a mobile device.

6. The method of claim 1, further comprising:
    detecting contents of the electronic document; and
    selecting the first size of the digital overlay based on the contents of the electronic document.

7. The method of claim 1, further comprising:
    detecting size characteristics of the computing device;
    selecting a percentage of a screen of the computing device based on the size characteristics of the computing device; and
    determining the first size based on the percentage.

8. The method of claim 1, further comprising:
   determining a difference between the size of the bounded area component and a size of the user interface; and
   selecting the first size based on the difference between the size of the bounded area component and the size of the user interface.

9. The method of claim 1, wherein:
   the first origin point defined relative to the bounded area component comprises an origin point defined by a corner of the bounded area component; and
   the second origin point defined relative to the digital overlay comprises an additional origin point defined by a corner of the digital overlay.

10. The method of claim 1, further comprising:
    providing a visual representation of the digital overlay for display, wherein the visual representation has a second size different than the first size.

11. The method of claim 1, further comprising detecting an indication that the original signature is complete by determining an expiration of a time period within which no user input related to providing the electronic signature is received.

12. The method of claim 1, wherein modifying the original signature comprises:
    scaling the original signature to fit within the bounded area component; and
    translating the scaled, original signature to align with the bounded area component.

13. A non-transitory computer readable storage medium storing instructions that, when executed by at least one processor, cause a computer system to:
    provide an electronic document for display via a user interface of a computing device, the user interface comprising a bounded area component of the electronic document;
    in response to identifying a user interaction with the bounded area component, collecting user input of a first portion of an electronic signature via the bounded area component in a first coordinate scheme having a first origin point defined relative to the bounded area component;
    generate a digital overlay having a first size exceeding a size of the bounded area component;
    receive user input of a second portion of the electronic signature via the digital overlay in a second coordinate scheme having a second origin point defined relative to the digital overlay;
    transfer at least one of the first portion of the electronic signature or the second portion of the electronic signature to a common coordinate scheme to generate an original signature in the common coordinate scheme based on the first portion of the electronic signature and the second portion of the electronic signature;
    modify the original signature to generate an adjusted signature; and
    provide the adjusted signature for display via the computing device within the bounded area component via the computing device.

14. The non-transitory computer readable storage medium of claim 13, further comprising instructions that, when executed by the at least one processor, cause the computer system to select the first size based on user age.

15. The non-transitory computer readable storage medium of claim 13, further comprising instructions that, when executed by the at least one processor, cause the computer system to provide a visual representation of the digital overlay for display, wherein the visual representation has a second size different than the first size.

16. The non-transitory computer readable storage medium of claim 13, further comprising instructions that, when executed by the at least one processor, cause the computer system to select the first size based on a determination that the computing device is a mobile device.

17. The non-transitory computer readable storage medium of claim 13, further comprising instructions that, when executed by the at least one processor, cause the computer system to:
    detect contents of the electronic document; and
    selecting the first size of the digital overlay based on the contents of the electronic document.

18. A system comprising:
    at least one processor; and
    at least one non-transitory computer readable storage medium storing instructions thereon, that, when executed by the at least one processor, cause the system to:
    provide an electronic document for display via a user interface of a computing device, the user interface comprising a bounded area component of the electronic document;
    in response to identifying a user interaction with the bounded area component, collect user input of a first portion of an electronic signature via the bounded area component in a first coordinate scheme having a first origin point defined relative to the bounded area component;
    generate a digital overlay having a first size exceeding a size of the bounded area component;
    receive user input of a second portion of the electronic signature via the digital overlay in a second coordinate scheme having a second origin point defined relative to the digital overlay;
    transfer at least one of the first portion of the electronic signature or the second portion of the electronic signature to a common coordinate scheme to generate an original signature in the common coordinate scheme based on the first portion of the electronic signature and the second portion of the electronic signature;
    modify the original signature to generate a final signature; and
    provide the final signature for display within the bounded area component via the computing device.

19. The system of claim 18, further comprising selecting the first size based on user age.

20. The system of claim 19, further comprising instructions that, when executed by the at least one processor, cause the system to select the first size based on a determination that the computing device is a mobile device.

* * * * *